United States Patent [19]

Caruso

[11] 4,320,389

[45] Mar. 16, 1982

[54] ELECTROMECHANICAL DECODER

[75] Inventor: Peter J. Caruso, Wayne, N.J.

[73] Assignee: The Bendix Corporation, Teterboro, N.J.

[21] Appl. No.: 328,083

[22] Filed: Dec. 4, 1963

[51] Int. Cl.[3] .............................................. H04Q 1/00

[52] U.S. Cl. ................................ 340/825.3; 102/262; 74/575

[58] Field of Search .......................... 340/164, 164 A; 102/70.2, 222, 229, 258, 262; 74/575, 144, 149

[56] References Cited

U.S. PATENT DOCUMENTS

| | | | |
|---|---|---|---|
| 2,595,614 | 5/1952 | Stickel | 340/164 A |
| 2,794,969 | 6/1957 | Barnhart | 340/164 A |
| 2,968,790 | 1/1961 | Carbonara | 340/164 A |
| 3,123,002 | 3/1964 | Spool | 102/70.2 |
| 3,311,880 | 3/1967 | Belanger | 340/164 R |
| 3,340,409 | 9/1967 | Probert et al. | 340/164 R |

*Primary Examiner*—Howard A. Birmiel
*Attorney, Agent, or Firm*—Anthony F. Cuoco; Vett Parsigian

EXEMPLARY CLAIM

1. A decoder mechanism comprising a code wheel assembly including
   - a first wheel element and a second wheel element,
   - a main code post means normally positioned for locking the first and second wheel elements in driving relation,
   - selectively operable means for actuating the main code post means in a predetermined sense for unlocking the first and second wheel elements,
   - auxiliary code post means effective upon the first and second wheel elements being in an unlocked relation,
   - said auxiliary code post means being operable by said selectively operable means in one sense for locking said first and second wheel elements and in another sense to retain said first and second wheel elements in said unlocked relation,
   - and means actuated by one of the wheel elements for performing a control function upon the first element being retained in said unlocked relation with the second element.

30 Claims, 18 Drawing Figures

ELECTROMECHANICAL DECODER

This invention relates to improvements in an electromechanical decoder mechanism of a type disclosed and claimed in copending U.S. application Ser. No. 306,792, filed Sept. 5, 1963, by Peter J. Caruso and assigned to The Bendix Corporation, assignee of the present invention, and more particularly to an electromechanical decoder mechanism embodying means for effecting maximum security in the performance of unique functions as in a launch controlling system for missiles.

An object of the invention is to provide an improved electromechanical decoder including a preset code locking means so arranged that a complementary or identical code input must be applied in order to unlock the device and means whereby once the device has been unlocked, the performance of an end function such as switch closure may readily take place.

Another object of the invention is to provide a drive for the aforenoted device including a pair of solenoids so arranged that each time one of the solenoids is selectively actuated, a code wheel assembly is step actuated while a series of code posts carried thereby are selectively actuated in locking or unlocking senses depending on the selection of the solenoid and preset adjustment of the code post together with novel operator-operative means for varying the preset adjustment of the code posts.

Another object of the invention is to provide in an electromechanical decoder a code wheel assembly so arranged that selective energization of the actuating solenoid to unlock the code wheel assembly cannot be discerned either electrically or audibly during the application of the coding signals together with novel means whereby the code to unlock the code wheel assembly may be varied at the will of the operator.

Another object of the invention is to provide in an electromechanical decoder suitable means for applying a plurality of decoding bits which may be stored therein and which may be effective to cause the release of an inner wheel from locking relation with an outer wheel of the code wheel assembly so that closure of a switch controlled by the outer wheel may be effected upon the application thereto of a plurality of code bits in a proper code sense and an arrangement in which there is provided novel operator-operative means to vary the code to unlock the inner and outer wheels, and means whereby if any or all of the code bits are improperly applied, the outer wheel may remain locked to the inner wheel so that the outer wheel may not be adjustably positioned to complete the decoding action or closure of the controlled switch.

Another object of the invention is to provide an electromechanical decoder including a code change solenoid selectively energized so as to actuate a rack into proper operating relationship with code change pinions carried by a plurality of code posts which may be readily adjusted to change the setting of the code for unlocking the decoder.

Another object of the invention is to provide an electromechanical decoder unit arranged to accept a serial code input and so arranged as not to interrogate each code input as received, but rather including means whereby the received code inputs may be stored and read out in parallel when the final unlocking code input is applied, together with a novel remote code changing mechanism whereby the code to effectively unlock the decoder may be readily impressed on the unit.

Another object of the invention is to provide an electromechanical decoder unit including operator-operative means to dissipate the code set into the unit upon the operator suspecting a security violation.

Another object of the invention is to provide an electromechanical decoding unit in which the amount of work done in applying any one code bit is exactly the same whether the code bit is "proper" or "improper" while the electrical emanations of the selectively actuated solenoids remain the same under all operating conditions so that the applicable code may not be discerned or deduced by monitoring the electrical emanations of the two selectively operated driver solenoids and which unit includes novel operator-operative means for effectively erasing the applicable code in such a manner as to prevent code deduction by visual scanning of an opened unit by hostile personnel.

Another object of the invention is to provide novel pawl disengaging means in an electromechanical decoder rendered effective upon simultaneous actuation of a pair of operator-operative pawl supporting members whereupon operation of an automatic reset mechanism may be initiated so as to cause the return of the code wheel assembly to an initial home or start position.

Another object of the invention is to provide in the code wheel assembly a plurality of code posts for locking the inner and outer wheels and which code posts may be preset to represent a series of digital 1 or 0 bits and in which arrangement each code post may be set to either of two positions, each 180° away from the other and held in such position by spring loaded detents, together with a pair of code erase wheels, one of said wheels to rotate certain of the code posts ninety degrees (90°) in a clockwise direction and the other of said wheels to rotate other of the code posts ninety degrees (90°) in a counterclockwise direction depending upon the initial code position of said posts so that in erase setting all of the code posts are so oriented as to erase all traces of the initial code setting.

Another object of the invention is to provide novel operator-operative means for rendering the code erase wheels effective to avoid any suspected violation of security conditions.

Another object of the invention is to provide an electromechanical decoder in which upon a code wheel being moved off a home position, an energy restore spring will be conditioned for selective operation to return the code wheel to the home position including a novel pivotal arm for lifting the two driver pawls from an operative position relative to a ratchet upon an operative mechanism for each of said pawls being simultaneously actuated so as to thereupon render effective the energy restore spring means to return the code wheel assembly to the home position.

Another object of the invention is to provide in the aforenoted electromechanical decoder a stepping arrangement including a ratchet wheel and a pair of actuating pawls cooperating therewith and controlled by stepping solenoids, the arrangement being such that a reset mechanism rendered effective upon simultaneous actuation of the stepping solenoids acts to lift the actuating pawls from operative relation with the ratchet wheel so as to condition the code wheel for return to a home position under the biasing force of a restoring spring means.

Another object of the invention is to provide a novel spring biased lever arm operative in one sense to lift the actuating pawls from an operative relation so as to permit return of the code wheel assembly to a start position under the biasing force of an energy restore spring means, and said code wheel assembly including means to operate said lever arm in another sense so as to permit the actuating pawls to return to the operative relation.

These and other objects and features of the invention are pointed out in the following description in terms of the embodiment thereof which is shown in the accompanying drawings. It is to be understood, however, that the drawings are for the purpose of illustration only and are not a definition of the limits of the invention. Reference is to be had to the appended claims for this purpose.

Figure 1:
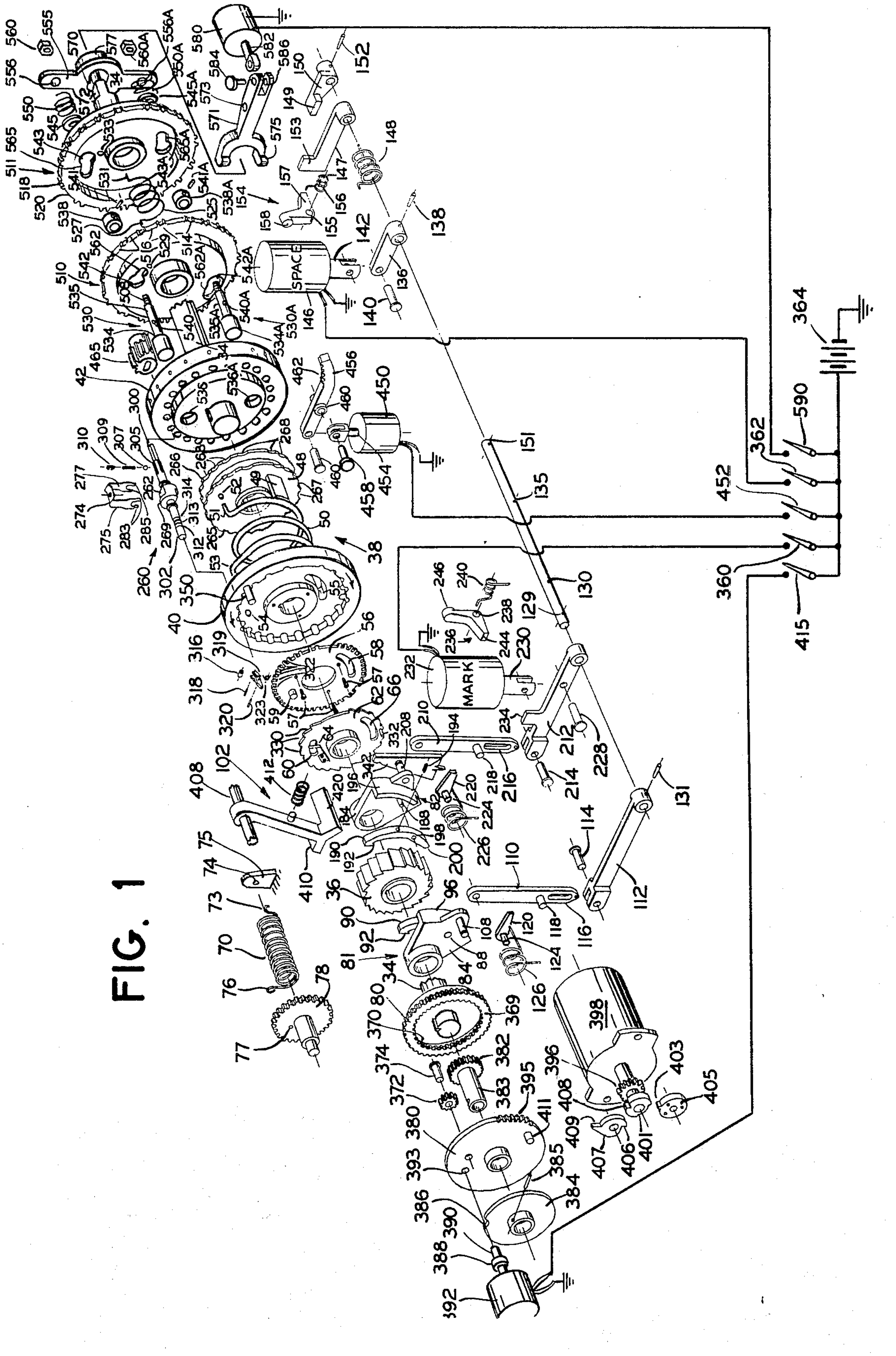
FIG. 1 is an exploded detail schematic diagram of an electromechanical decoder embodying the invention.
Figure 2:
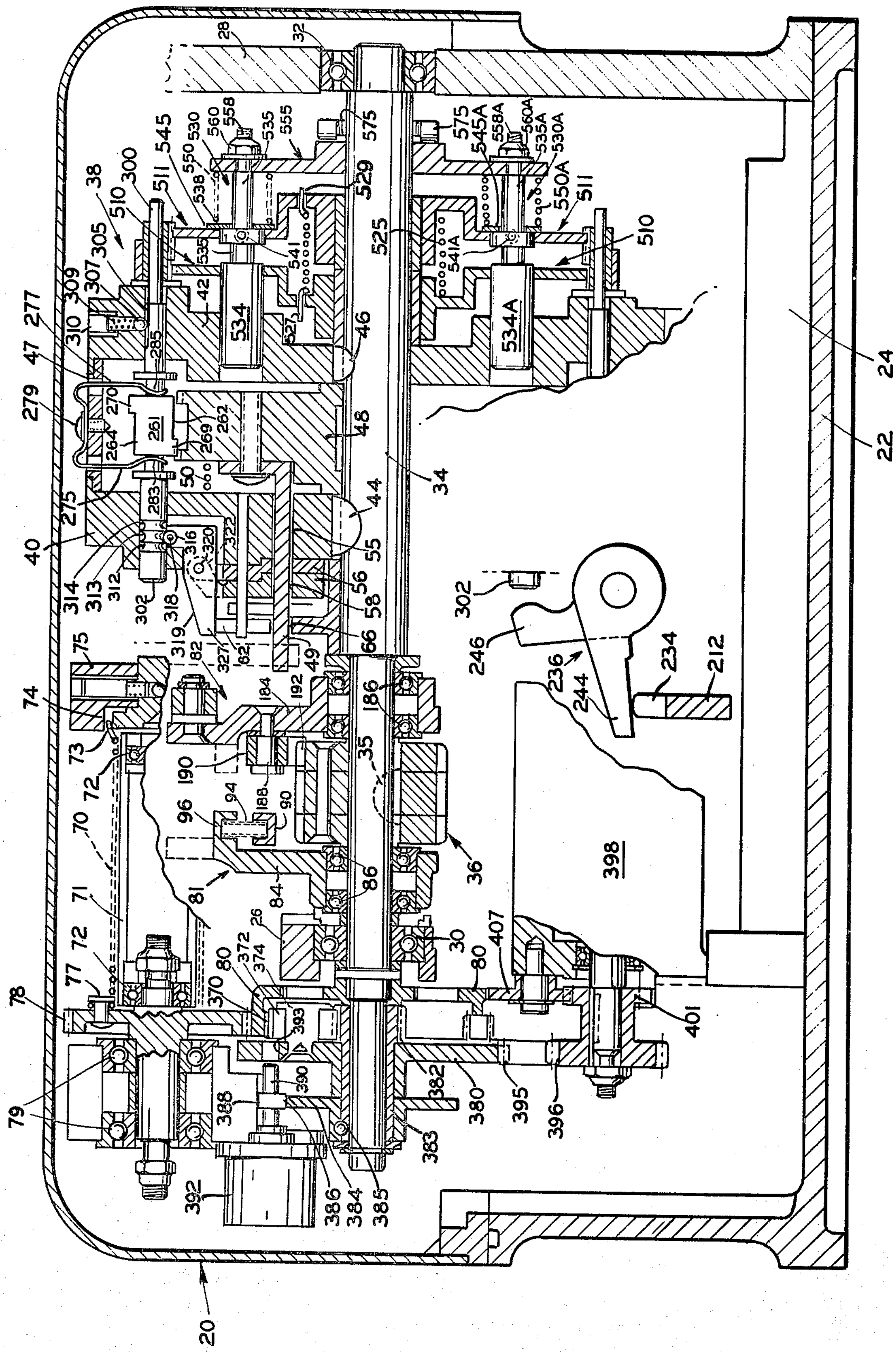
FIG. 2 is a fragmentary sectional view of the code wheel assembly illustrating one of the code posts in an operative relation.

Referring to the drawings of FIGS. 1 and 2, a decoder mechanism is shown housed in a casing 20 having a base 22 to which may be fastened a base plate 24. There may project from the base plate 24 end plates 26 and 28 in which there may be rotatably mounted a shaft 34 on roller bearings 30 carried by end plate 26 and roller bearings 32 carried by the end plate 28. The decoder shaft 34 has secured thereto by a key 35 a ratchet wheel 36 and a code wheel assembly 38.

The code wheel assembly 38, as shown in FIGS. 1 and 2, includes outer wheel elements 40 and 42 which are keyed to the shaft 34 at 44 and 46 and fastened one to the other by an annular supporting member 47. Angularly movable on the shaft 34 and within the annular supporting member 47 is an inner wheel element 48 operatively connected to the outer wheel element 40 by a light coupling spring 50 connected at one end 51 to the inner wheel element 48 at 52 and at the opposite end 53 at 54 to the outer wheel element 40. There projects from the inner wheel element 48 an arm 49 normally biased by the preload of the coupling spring 50 in a clockwise direction in an arcuate slot 55 provided in the outer wheel element 40.

Further, positioned adjacent the outer wheel element 40 is a latching wheel 56 secured to the outer wheel element 40 by bolts 57. There is provided in the latching wheel 56 a slot 58 positioned in corresponding relation to the slot 55 for receiving the arm 49 arcuately movable therein.

There projects from the latching wheel 56 a pin 59 positioned in an arcuate slot 60 provided in a reset wheel 62 and arranged in cooperative relation with a leaf spring 64 carried by the reset wheel 62. The reset wheel 62 is arranged in cooperative relation with the latching wheel 56, as hereinafter explained. There is further provided in the reset wheel 62 an arcuate slot 66 positioned in corresponding relation to the slots 55 and 58 for also receiving the arm 49 arcuately movable therein.

A reset or return spring 70, as shown in FIGS. 1 and 2, may be coiled about a tubular member 71 carried by suitable bearings 72. The reset spring 70 has one end secured at 74 to a member 75 affixed to the base 24 while another end 76 of the reset spring 70 is secured at 77 to a gear 78 rotatably mounted in bearings 79 and operating in tooth engagement with a ring gear 80 suitably keyed to the shaft 34. The reset spring 70 is arranged to be tensioned upon angular movement of the shaft 34 by step action of the pawls 90 and 190 so as to be effective to return the shaft 34 to a safe, home, or null position upon release of the actuating pawls, as hereinafter explained.

PAWL ACTUATING MECHANISM

Figure 16:
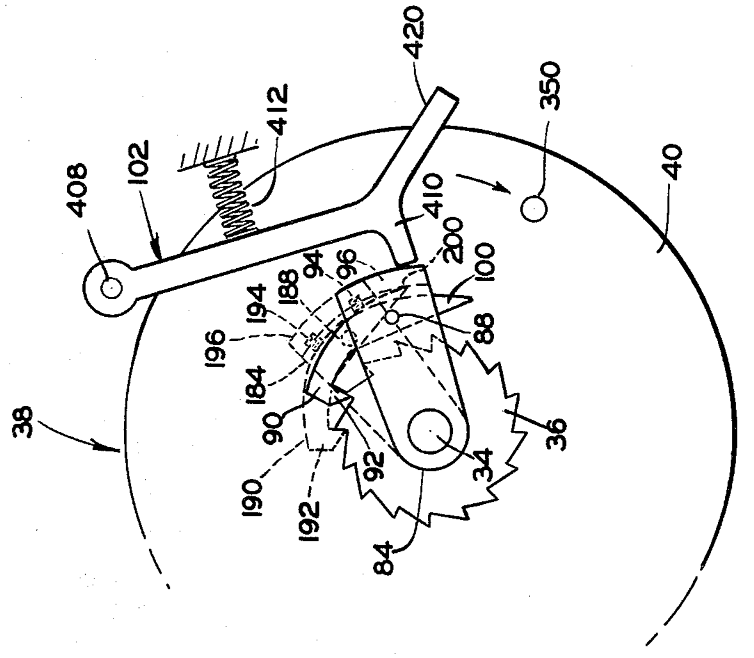
FIG. 16 is a fragmentary schematic view illustrating the pawl lift lever in a standby position relative to the actuating pawls upon only one of the pawls being step actuated.

Further, cooperating with the code wheel assembly 38 adjustably positioned by the shaft 34 are pawl actuating mechanisms indicated generally by the numerals 81 and 82. The pawl actuating mechanism 81 includes a pawl supporting member 84 angularly movable on bearings 86 carried by the shaft 34. The pawl supporting member 84 has pivotally connected thereto by a pin 88 a pawl 90 having a tooth 92 biased into operating engagement with the teeth of the ratchet wheel 36 by a spring 94 positioned between the pawl 90 and arm 96 projecting from the members 84, as shown in FIGS. 2 and 16. The pawl 90 has an end portion 100 arranged to be actuated by a pawl pick-up lever 102, shown in FIGS. 1 and 15–18, and explained hereinafter in greater detail.

The pawl supporting member 84 has operatively connected thereto by a pin 108 one end of an actuating linkage 110 operatively connected at an opposite end to an arm 112 through a pin 114 carried by the arm 112 and slidably positioned in a slot 116 in the opposite end of the link 110. A pin 118 projects from the link 110 and is operatively engaged by an arm 120 pivotally supported by a pin 124 and biased by a code wheel advance spring 126 into operative engagement with the pin 118.

The arm 112 is operatively connected at 129 to a shaft 130 by a pin 131. The shaft 130 is rotatably mounted in suitable bearings carried by the end plate 26 while the opposite end of the shaft 130 is rotatably mounted in suitable bearings carried by the end plate 28, as shown, for example, in the U.S. application Ser. No. 306,792, filed Sept. 5, 1963, by Peter J. Caruso, and assigned to The Bendix Corporation, assignee of the present invention.

Further, operatively connected to the shaft 130 at 135 is an arm 136 connected thereto by a pin 138. Connected to the arm 136 by a pin 140 is a rod 142 actuated by a solenoid 146. Further, angularly movable on the shaft 130 is an arm 147 drivingly connected to the arm 136 by a spring 148 which tends to bias the arm 147 into engaging relation with a projecting portion 149 of an arm 150 connected to the shaft 130 at 151 by a pin 152. The arm 147 has an end portion 153 arranged to operatively engage a knocker arm 154 pivotally mounted on a pin 155 carried by a flange projecting from the base 24, and biased by a spring 156 so as to maintain an end portion 157 thereof in operative engagement with the end portion 153 of the arm 147 while another end portion 158 of the knocker arm 154 has a head portion which upon energization of the solenoid 146 may be actuated into operative engagement with end portions 300 and 300A of the slidable code posts 260 and 260A carried by the outer wheel elements 40 and 42 of the code wheel assembly 38 to longitudinally actuate the code posts in one sense, as heretofore explained in the aforenoted application Ser. No. 306,792, filed Sept. 5, 1963, by Peter J. Caruso, and assigned to The Bendix Corporation.

The spring 148 is arranged to release the driving connection between the solenoid 146 and the arm 147 upon a code post being longitudinally actuated in an opposing sense as upon simultaneous energization of both solenoid 146 as well as opposing actuating solenoid 232, as hereinafter explained.

Further, the pawl actuating mechanism 82 includes a pawl supporting member 184 angularly movable on bearings 186 carried by the shaft 34. The pawl supporting member 184 has pivotally connected thereto by a pin 188, a pawl 190 having a tooth 192 biased into operating engagement with the teeth of the ratchet wheel 36 by a spring 194, shown in FIGS. 1 and 16, and positioned between the pawl 190 and arm 196 projecting from the member 184. The pawl 190 has an end portion 200 arranged to be operatively engaged by the pawl pick-up lever 102, shown in FIG. 1, as hereinafter explained.

The pawl supporting member 184 has operatively connected thereto by a pin 208 an end of an actuating linkage 210 operatively connected at an opposite end to an arm 212 through a pin 214 carried by the arm 212 and slidably positioned in a slot 216 in the opposite end of the link 210. A pin 218 projects from the link 210 and is engaged by an arm 220 pivotally supported by a pin 224 and biased by a code wheel advance spring 226 into operative engagement with the pin 218.

The arm 212 is angularly movable on the shaft 130 and has operably connected thereto by a pin 228 a rod 230 actuated by a solenoid 232, and further, there projects from the arm 212 a portion 234 arranged to operatively contact a knocker arm 236 pivotally mounted on a pin 238 carried by a flange projecting from the base plate 24.

The knocker arm 236 is biased by a spring 240 so as to maintain an end portion 244 thereof in operative engagement with the portion 234 of the arm 212 while another portion 246 of the knocker arm 236 has a head portion which may be actuated by the portion 234 of the arm 212 into an operative engagement with the slidable main and auxiliary code posts 260 and 260A carried by the outer wheel elements 40 and 42 of the code wheel assembly 38, as heretofore explained in the aforenoted U.S. application Ser. No. 306,792, filed Sept. 5, 1963, by Peter J. Caruso, and assigned to The Bendix Corporation.

CODE WHEEL ASSEMBLY

The code wheel assembly 38, shown in FIGS. 1, 2, and 5 includes a plurality of main locking code posts 260 and auxiliary code posts 260A, as hereinafter described, slidably mounted in the outer wheel elements 40 and 42. Each of the main code posts 260 include a member 261 positioned intermediate the opposite ends thereof having indented flat portions 262 and 264 arranged in spaced relation 180° apart. The indented portions 262 and 264 may be selectively positioned so as to so cooperate with flange portions 265 and 266 of the inner wheel element 48 so as to permit the inner wheel element 48 upon adjustment of the post 260 in one sense, as shown in FIG. 12, to move free of the outer wheel elements 40 and 42 against the light biasing force of the coupling spring 50.

Figure 12:
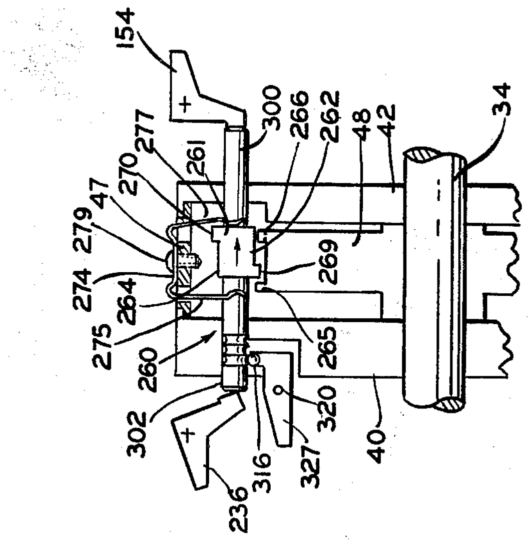
FIG. 12 is a view of the fragmentary code wheel assembly of FIG. 11 with the main code post adjusted from a neutral position to an unlocking position relative to the code wheel assembly as upon receipt of a proper code bit.
Figure 11:
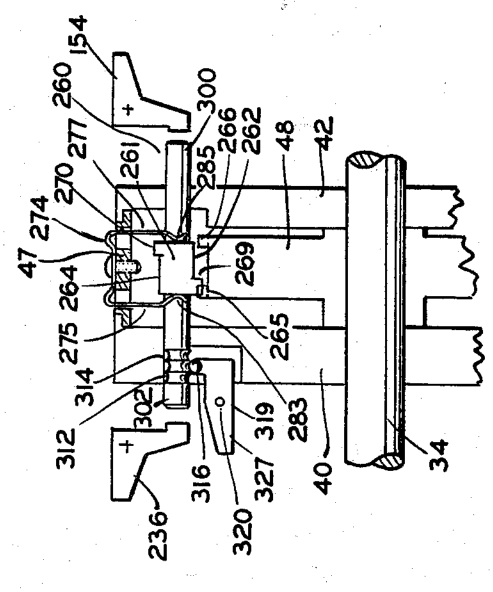
FIG. 11 is a partial fragmentary sectional view of the code wheel assembly of FIG. 2 and showing a main code post in a neutral locking position relative to the code wheel assembly.
Figure 13:
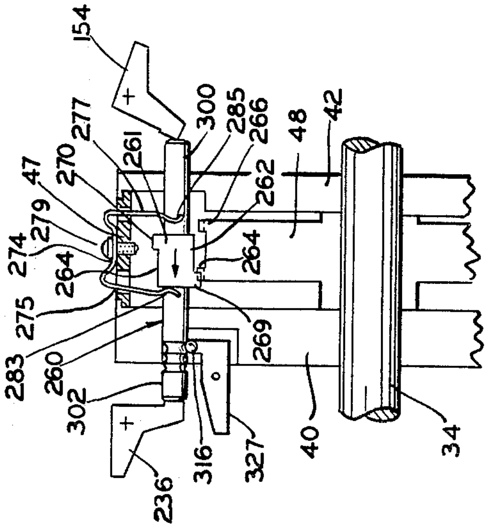
FIG. 13 is a view of the fragmentary code wheel assembly of FIG. 11 with the main code post adjusted from a neutral position to a locking position relative to the code wheel assembly as upon receipt of an improper code bit.

The inner wheel element 48, as best shown in FIG. 1, includes the flange portions 265 and 266 positioned in spaced relation and having indent portions 267 and 268, respectively, arranged to cooperate with raised portions 269 and 270 of the member 261 so as to lock the inner wheel 48 in operative relation with the outer wheel elements 40 and 42, as shown for example, in FIGS. 11 and 12 upon the main code post 260 being adjusted in a neutral position, shown in FIG. 11, or to the position shown in FIG. 13 in response to an improper bit.

The member 261 of the main code post 260 is further so arranged as to be operatively engaged by a U-shaped release spring 274 having spring legs 275 and 277. The U-shaped springs 274 are secured in the annular supporting member 47 and so arranged that opposite end portions 283 and 285 of the spring legs 275 and 277 bear on opposite ends of the member 261 so as to normally bias the main code post 260 to the neutral position, shown in FIGS. 2 and 11.

However, upon longitudinal actuation of the main code post 260 in one sense, as shown for example in FIG. 12, against the biasing force of spring 277, the member 261 of the main code post will be adjusted so as to position the indent portion 262 immediately adjacent the outer periphery of the flange portion 266 of the inner wheel 48 so as to release the same from a locking position relative to the outer wheels 40 and 42 and thereupon the outer diameter of the inner wheel 48 is permitted to pass the code post at the indent portion. Conversely, upon actuation of the main code post 260 in an opposite sense against the biasing force of the spring 275, the code post may be so positioned that the raised portion 269 of the member 261 of the main code post 260 is adjustably positioned in an indent portion 267 of the flange portion 265 of the inner wheel element 48 and in locking relation with the inner wheel element 48, as shown for example, in FIG. 13, whereupon the outer diameter of the flange portion 265 of the inner wheel is not permitted to pass the code post.

Figure 5:
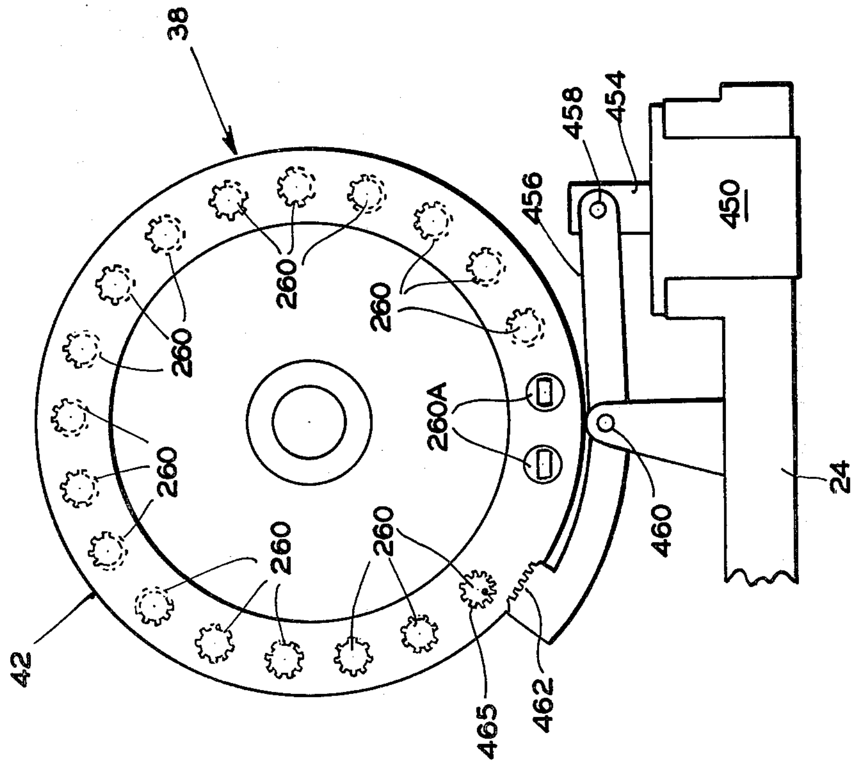
FIG. 5 is an enlarged fragmentary end view of the code change mechanism.
Figure 6:
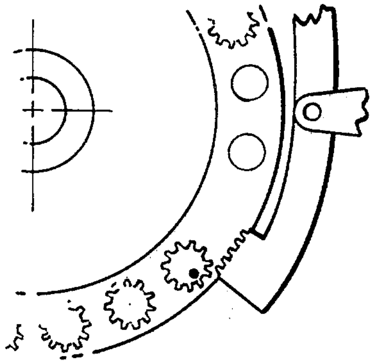
FIG. 6 is a fragmentary view illustrating the start of the code change operation.
Figure 7:
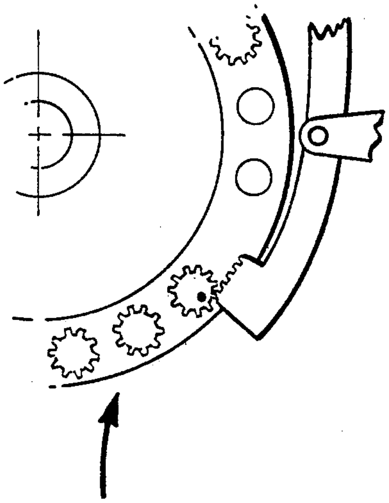
FIG. 7 is a fragmentary view illustrating the code change rack in engaging relation.
Figure 8:
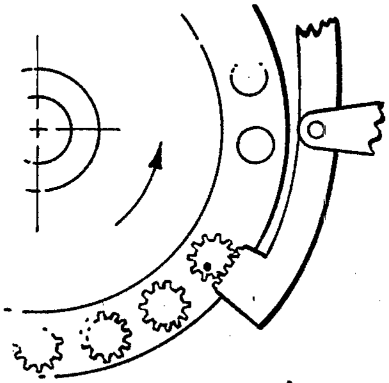
FIG. 8 is a fragmentary view illustrating a partial rotation of the code post by the code change rack.
Figure 9:
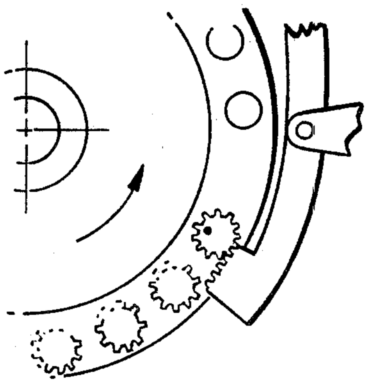
FIG. 9 is a fragmentary view illustrating the complete rotation of the code post by the code change rack.
Figure 10:
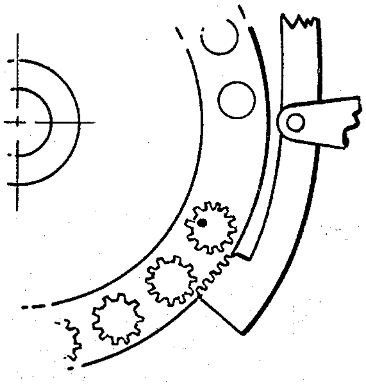
FIG. 10 is a fragmentary view illustrating the code change rack in a code post disengaging relation upon completion of the code change operation.
Figure 14:
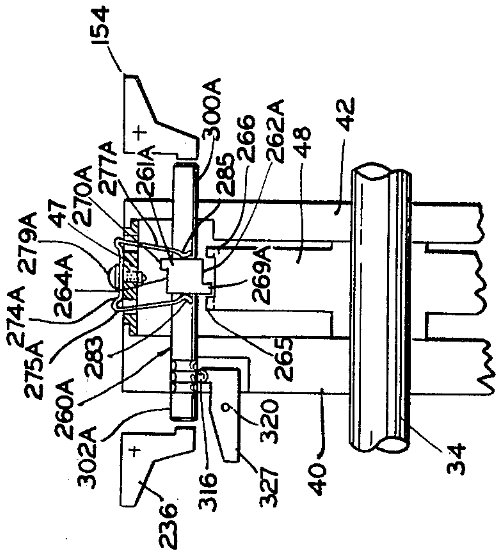
FIG. 14 is a partial fragmentary sectional view of the code wheel assembly showing an auxiliary code post in a neutral unlocking position relative to the code wheel assembly.

In the illustration of the invention herein provided, the first eighteen of the main code posts 260 may be of identical structure, while the last two auxiliary code posts 260A, as shown in FIGS. 5 and 14, are so constructed that the member 261A in the neutral position, shown in FIG. 14, is so arranged as to be in an unlocking relation to the inner wheel element 48. Corresponding parts in the code post 260A to those described with reference to the code post 260 have been identified in FIG. 14 by like numerals bearing the suffix A.

Thus a proper code signal will cause the auxiliary code post 260A to remain in an unlocked relation while an improper code signal will cause the knocker arm 154 or 236, dependent upon the angular adjusted operative position of the code post 260A, to actuate the auxiliary code post 260A into a locking position relative to the inner wheel element 48. This locking action of the auxiliary code post 260A will prevent further advance of the code post assembly 38 and will deny further access to any other code posts in the decoder mechanism. The auxiliary code posts 260A of the 19th and 20th positions do not have remote change capability, but may be changed manually upon access to the interior of the decoder mechanism.

The main code posts 260, however, may be selectively rotated 180° by a remote code change mechanism, as hereinafter explained, so as to change the operative relation described and bring the indent portion 264 into operative relation upon actuation of the main code post 260 to the position shown by FIG. 13, while the raised portion 270 is then effective to lock the inner wheel element 48 and outer wheel elements 40 and 42 upon actuation of the main code post 260 to the opposite position shown by FIG. 12.

The actuation of the main code posts 260 in the one and other senses described in reference to FIGS. 12 and 13 may be selectively effected by the knocker arm 154, as shown in FIG. 13, and the knocker arm 236, as shown in FIG. 12, and the code wheel assembly 38 may be rotated in a step action by the pawl actuating mechanism 81 and 82 in operative relation with the ratchet wheel 36.

The auxiliary code posts 260A may be similarly selectively actuated by the knocker arms 154 and 236 from the unlocked neutral position shown in FIG. 14 into a locked relation between the inner wheel element 48 and the outer wheel elements 40 and 42 after receipt of an improper code signal while remaining in an unlocked relation upon receipt of a proper code signal.

Selective energization of the solenoids 146 and 232 control respectively the knocker arms 154 and 236 and the tension applied to the code wheel advance springs 126 and 226. While upon deenergization of the selected solenoid 146 or 232, as the case may be, the energy stored in the code wheel advance spring becomes effective to actuate the pawl actuating mechanism (81 or 82) and thereby the ratchet wheel 36 to move the code wheel assembly 38 to the next succeeding position with a step action.

In the step actuation of the ratchet wheel 36, the energization of the selected solenoid (146 or 232) conditions the pawl (90 or 190) controlled thereby for operation relative to the ratchet wheel 36 while the other pawl maintains the ratchet wheel 36 and thereby the code wheel assembly 38 in a fixed position until deenergization of the selected solenoid renders the tensioned code wheel advance spring (126 or 226) effective to cause the controlled pawl to actuate the code wheel assembly 38 to the next succeeding position for effecting successive operation of the several code posts 260, as hereinafter described in greater detail.

Further, each of the main code posts 260 includes an end portion 300 protruding from the outer wheel element 42 and arranged for selective operation by the end portion 158 of the knocker arm 154, as shown in FIGS. 1 and 13, while the opposite end of the main code post 260 includes an end portion 302 protruding from the outer wheel element 40 and arranged for actuation by the end portion 246 of the knocker arm 236, as shown in FIGS. 1 and 12.

In the end portion 300 of the main code post 260, there are arranged longitudinal slots 305, as possibly best shown in FIGS. 1 and 2. Cooperating with the slots 305 is a ball detent 307 biased by a spring 309 held by a bolt 310 so as to releasably resist angular rotation of the main post 260 and thereby maintain the same in an angularly adjusted position in the outer wheel elements 40 and 42.

Further, in the opposite end portion 302 of the main code post 260, there are provided indent portions 312, 313, and 314 arranged in spaced relation so as to cooperate with a locking detent or roller member 316 upon actuation of the main code post 260 in one or the other of the longitudinal senses illustrated in FIGS. 11, 12, and 13.

The auxiliary code posts 260A, as shown in FIG. 14, have a similar structure to that of the main code posts 260 in which corresponding parts are indicated by corresponding numerals to which has been added the suffix A for the parts of the auxiliary code post 260A.

Each of the locking detent or roller members 316, are pivotally mounted by a pin 318 carried by a lever arm 319 which is in turn pivotally mounted by a pin 320 carried by ears 322 projecting from the periphery of the latching wheel 56. A spring 323 about the pin 320 biases the lever arm 319 in a counterclockwise direction so as to position the detent or roller member 316 into operative engagement with the indent portion 312 or 314, as the case may be, upon actuation of the post 260 from the neutral position, shown in FIG. 11 to one or the other of the positions illustrated in FIGS. 12 and 13. The opposite end portion 327 of each of the lever arms 319 are positioned in a ramp like tooth recess 330 formed in the periphery of the reset wheel 62, as shown in FIGS. 1 and 2.

The latching wheel 56, as shown in FIGS. 1 and 2, has the pin 59 projecting into the slot 60 provided in the reset wheel 62 and cooperating with the leaf spring 64 so as to limit the angular movement of the reset wheel 62 relative to the outer wheel 40. Further, there projects from the opposite side of the reset wheel 62 a pin 332 cooperatively arranged in relation to the stop 342 carried by the base 24 of the unit, as hereinafter explained.

Further, as shown in FIG. 1, a pin 350 projects from the outer wheel element 40 in cooperative relation with the pawl lifting lever 102 for positioning the lever 102 out of operative relation with the pawls 90 and 190, as hereinafter explained.

As shown in FIG. 1, there projects from the inner wheel element 48 an arm 49 which extends through the arcuate slots 55, 58, and 66 into engaging relation with a stop 342 projecting from the base 24 so as to limit clockwise motion of the code wheel assembly 38 by the stepping action of pawls 90 and 190.

In the event the outer wheel elements 40 and 42 remain in a locked relation with the inner wheel element 48 following receipt of a faulty decoding message, engagement of the arm 49 at the stop 342 limits the clockwise actuation of the code wheel assembly 38 and prevents subsequent operation of the mechanism controlled by the decoder mechanism.

However, upon a proper decoding message being received by the decoder causing the locking posts 260 to be selectively actuated so as to unlock the inner wheel element 48 from the outer wheel elements 40 and 42 and permit free angular movement of the outer wheel elements 40 and 42 relative to the inner wheel element 48 upon the completion of the decoding message at which time the arm 49 of the inner wheel element 48 operatively engages the stop 342.

In the latter case the biasing force asserted by the code wheel advance spring (126 and 226) is sufficient to overcome the resilient force applied through the light coupling spring 50 to the inner wheel element 48 so as to permit further angular movement of the outer wheel elements 40 and 42 in a clockwise direction relative to the inner wheel element 48 subject to proper actuation of the auxiliary code posts 260A in the 19th and 20th positions.

Thus the inner wheel element 48 is held by the arm 49 engaging the stop 342 while the outer wheel elements 40 and 42 of the code wheel assembly 38 may continue to be driven in a clockwise direction by the actuating pawls 90 or 190 within the arcuate clearance defined by the slots 55, 58, and 66, within which the arm 49 is arcuately movable, and subject to the proper selective actuation of the code posts 260A in the 19th and 20th positions so as not to lock the inner wheel element 48 to the outer wheel elements 40 and 42.

The code posts 260A, as shown in FIG. 14, are so arranged that, in the neutral position, the same are held in unlocked relation to the inner wheel 48. Thus, a proper code signal selectively applied, for example, through the solenoid 232 so as to cause the knocker arm 236 to actuate code post 260A in a longitudinal sense to the right will cause the code post 260A to remain in an unlocked relation with respect to the inner wheel element 48. However, if an improper code signal is applied, for example, to the solenoid 146 so as to cause the code post 260A to be actuated in an opposite longitudinal sense so as to cause the member 261A to actuate element 269A into locking relation with the indent portion 267 of the flange portion 265 of the inner wheel element 48, such action will cause the code post 260A to lock the inner wheel element 48 to the outer wheel elements 40 and 42. This action will then prevent any further advance of the code wheel assembly 48 under the biasing force of the code wheel advance spring 126 and will deny further access to any code post in the unit. The code post 260A in the 19th and 20th positions are not provided with remote change capability, but the same may be changed manually by angular movement thereof for 180° upon access to the interior of the decoder.

In the event that the 19th and 20th code signals are properly applied, the outer wheel elements 40 and 42, together with the shaft 34 are step actuated by the selective actuation of the pawls 90 and 190 so as to effect closure of the control switch, as hereinafter explained.

The selective actuation of the solenoids 146 and 232 will provide the required decoding message to effect the unlocking action of the main code posts 260 of the outer wheel elements 40 and 42 relative to the inner wheel element 48 as well as the selective actuation of the auxiliary code posts 260A. Thus the decoding message may be provided by the selective operation of the control switches 360 and 362 controlling energizing circuits from a battery 364 for the respective solenoids 146 and 232, as shown in FIG. 1, or other suitable control mechanisms may be provided.

FIRING SWITCH CONTROL

Upon the outer wheel elements 40 and 42 being unlocked from the inner wheel element 48, the further angular adjustment of the outer wheel elements 40 and 42 relative to the inner wheel element 48 through the pawl actuating mechanisms 81 and 82 causes the shaft 34 to be angularly adjusted so as to in turn position the ring gear 80 and through the gear 78 to tension the reset spring 70, as heretofore explained.

The ring gear 80 includes internal gear teeth 370 operating in tooth engagement with the gear teeth of a planet gear 372 rotatably mounted on a pin 374 carried by an interruptor gear 380. The planet gear 372 in tooth engagement with the internal gear teeth 370 is also in driving tooth engagement with a sun gear 382 which is secured to a stub shaft 383 which is in turn drivingly connected to a locking plate 384 by a pin 385. The interrupter gear 380 is rotatably mounted on the stub shaft 383.

The locking plate 384 has a recessed portion 386 for receiving an annular flange 388 affixed to a plunger 390 upon de-energization of the solenoid 392. In the start position of the decoder and upon energization of the solenoid 392 by closure of switch 415, the plunger 390 will be actuated by the solenoid so that the outer end thereof is positioned in an opening 393 in the interrupter gear 380 locking the interrupter gear 380 from rotation, and in which position of the plunger 390, the annular flange 388 is positioned out of the recessed portion 386 and out of locking relation with the plate 384.

Upon return of the code wheel assembly 38 and the locking plate 384 to the start position shown, de-energization of the solenoid 392 by the opening of switch 415 will render suitable spring means, not shown, in the solenoid 392 effective to bias the plunger 390 out of locking relation with the interrupter gear 380 and return the annular flange 388 into recess 386 in locking relation with the plate 384.

In this connection, it may be noted that the locking of the plate 384 by the flange 388 also locks the sun gear 382 from rotation while permitting the planet gear 372 to be driven about the sun gear 382 and thereby impart through the stub shaft 374 rotation to the interrupter gear 380 so as to effect operation of a gear tooth portion 395 of the interrupter gear 380 arranged for tooth engagement during the last operation with a pinion gear 396, shown in FIGS. 1 and 2, to operatively perform a desired switching function such as the closing of a control switch 398.

There may be further affixed to the pinion gear 396 a rotatable member 401 locked by a projection 403 on a fixed member 405 from rotation in one sense while the member 401 is releasably locked from rotation in an opposite sense by a projection 406 at one end of a releasable pivotal locking device 407. The projection 406 is arranged to be positioned in a recess 408 provided in the member 401 so as to prevent the control switch 398 from being inadvertently closed. The releasable pivotal locking device 407 has a projection 409 at an opposite end arranged to be actuated by a pin 411 carried by the interrupter gear 380 so as to position the pivotal device 407 out of locking relation with the member 401 and thereafter permit the closing of the control switch 398 upon the subsequent tooth engagement of the gear portion 395 of the interrupter gear 380 with the pinion 396.

However, in the start position of the decoder mechanism, if it is desired to test the operation of the decoder to effect a remote code change, as hereinafter explained, the solenoid 392 may be energized by the operator closing the firing switch control 415, whereupon the plunger 390 will be actuated into engaging relation in the hole 393 provided in the interrupter gear 380 so as to lock the interrupter gear 380 from rotation while, at the same time, the locking flange 388 is positioned out of locking relation in the recessed portion 386 of the locking plate 384.

Upon the locking of the interrupter gear 380 from rotation, the step actuation of the pawls 90 and 190 will then cause rotation of the shaft 34 and thereby ring gear 80 so as to effect rotation of the planet gear 372 on the stub shaft 374 which is then held in a fixed position by the locked interrupter gear 380 so that the planet gear will freely rotate the sun gear 382 without imparting any motion to the interrupter gear 380 which has been thus effectively locked from operating the control switch 398.

However, upon the interrupter gear 380 being unlocked, the plate 384 being locked and the outer wheel elements 40 and 42 of the code wheel assembly 38 being unlocked from the inner wheel element 48 following receipt of a correct decoding message, the outer wheel elements 40 and 42 may after the arm 49 engages the stop 342 be actuated an additional angular extent permitted by the arcuate slots 55, 58, and 66 so as to effect the closure of the control switch 398.

However, upon the outer wheel elements 40 and 42 remaining in locked relation with the inner wheel element 48 following receipt of a faulty decoding message, the engagement of the arm 49 with the stop 342 at the limit of clockwise rotation thereof provided by the step action of the pawls 90 or 190 will prevent the subsequent angular adjustment of the shaft 34 and the interrupter gear 380 necessary to effect closure of the control switch 398.

In the latter case or in any position of the code wheel assembly 38 intermediate such position and the home position, the operator may effect the return of the code wheel assembly to the home position by the simultaneous energization of the solenoids 146 and 232.

CODE WHEEL ASSEMBLY RESET MECHANISM

The reset operation may be effected by the operator simultaneously closing the switches 360 and 362 which will in turn cause a simultaneous energization of the stepper solenoids 146 and 232 to cause the pawl actuating mechanisms 81 and 82 to be actuated upwardly in a counterclockwise direction about the shaft 34.

Figure 15:
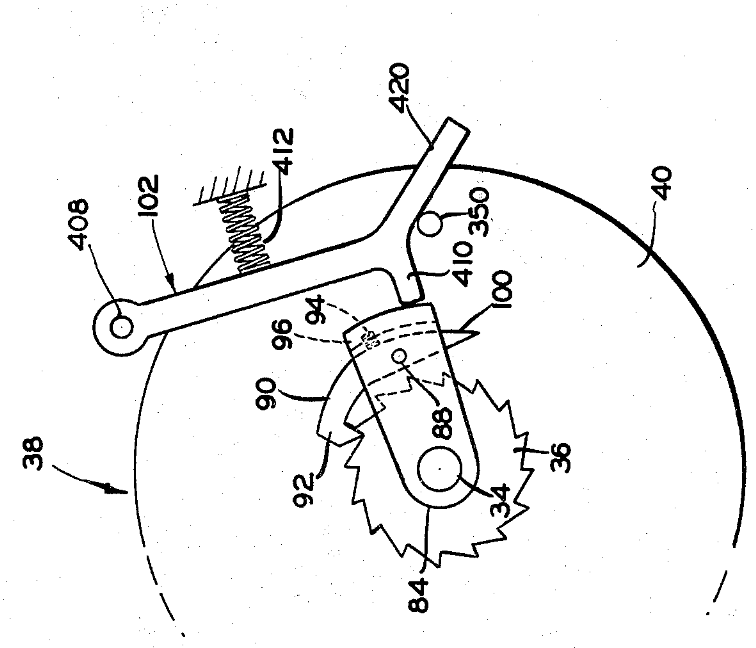
FIG. 15 is a fragmentary schematic view illustrating the pawl lift lever in a standby position relative to the actuating pawls.
Figure 17:
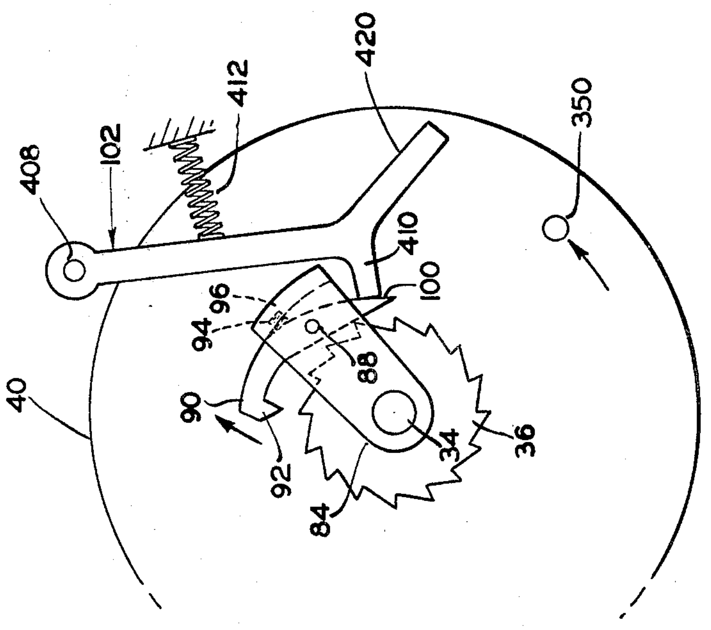
FIG. 17 is a fragmentary schematic view illustrating the pawl lift lever in an operative position lifting both pawls out of engaging relation with the ratchet upon simultaneous actuation of both pawls so as to condition the code wheel for return to a home position under the biasing force of a restoring spring means.

The pawl pick-up lever 102 is pivotally mounted at one end by a pin 408 and includes a portion 410 which rides along the arcuate outer surface of the arm portions 96 and 196 of the pawl supporting members 84 and 184, as shown by FIGS. 15 and 16, so that upon both of the pawl actuating mechanisms 81 and 82 being biased upwardly to the last-mentioned extreme position effected by the actuating solenoid 146 and 232, the pawl actuating lever 102 is biased by a spring 412, as shown in FIG. 17, so as to position a portion 410 of the pawl actuating mechanism 102 into engagement with the end portions 100 and 200 of the pawls 90 and 190 so as to pivot the same in a clockwise direction about the pins 88 and 188, respectively, and thereby actuate the teeth 92 and 192 out of operative engagement with the teeth of the ratchet wheel 36 against the biasing force of the springs 94 and 194, respectively.

In order to effect this operation, it is necessary that both of the pawl actuating solenoids 146 and 232 be energized together or other wise the portion 410 of the pawl actuating mechanism 102 riding on the arm portion 96 or 196 of the unactuated pawl actuating mechanism 81 or 82, as the case may be, will hold the portion 410 of the pawl actuating lever 102 out of operative engagement, as shown, for example, by FIG. 16.

Figure 18:
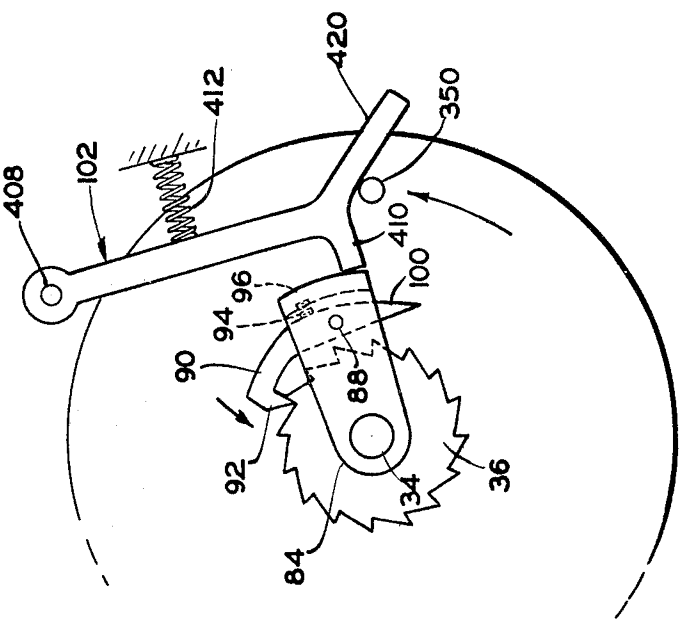
FIG. 18 is a fragmentary schematic view illustrating the pawl lift lever being reset to the standby position of FIG. 15 by a pin carried by the code wheel assembly on the return thereof to the home position under the biasing force of the restoring spring means.

However, upon the simultaneous actuation of the pawl actuating solenoids 146 and 232, the portion 410 of the pawl pick up lever 102 will cause the teeth 92 and 192 of the pawls 90 and 190 to be actuated out of tooth engagement with the teeth of the ratchet wheel 36 so as to cause the code wheel assembly 38 to be biased in a counterclockwise direction to the start, home, or null position under the biasing force of the reset spring 70, as shown by FIGS. 17 and 18.

The pawl pick-up lever 102 also includes a portion 420 so arranged as to be engaged by the pin 350 projecting from the outer wheel element 40, as shown by FIG. 18, upon the code wheel assembly 38 being driven in a counterclockwise direction by the spring 70. The latter action which causes the pawl pick-up lever 102 to be pivoted about the pin 408 in a counterclockwise direction against the biasing force of spring 412 so as to cause the portion 410 of the lever 102 to release the pawls 90 and 190 and permit the teeth 92 and 192 to once again engage a tooth of the ratchet 36 at the home, null, or start position.

The reset wheel 62 also includes the pin 332 arranged to engage the stop 342 upon the arm 49 approaching the home position under the force of the return spring 70 biasing the code wheel assembly 38 in a counterclockwise direction, as viewed in FIGS. 1 and 17-18. The pin 332 upon engaging the stop 342 is effective to actuate reset wheel 62 in a clockwise direction relative to the latching wheel 56 carried by the code wheel assembly 38 so as to cause the ramp like teeth 330 formed in the periphery of the reset wheel 62 to actuate the several levers 319 in a clockwise direction about the pin 320 and in opposition to the biasing force of the spring 323 so as to cause the detents or roller member 316 to move out of the indent portions 312 or 314, as the case may be, and permit the code post 260 or 260A controlled thereby to be biased by the spring elements 275 or 277, as the case may be so as to return to the neutral position, shown in FIG. 11.

The pin 59 projecting from the latching wheel 56 is arranged in cooperating relation in the arcuate slot 60 of the reset wheel 62 so as to limit the angular adjustment of the reset disc 62 in the clockwise direction relative to the latching wheel 56.

The reset disc 62 is freely mounted on the shaft 34 and normally follows the adjustment of the outer wheel element 40 within the limits of the slot 60 through the coupling action of the spring 64 so that the locking detent members 316 under the biasing force of the springs 323 are rendered effective to lock the code posts 260 or 260A in one or the other of the adjusted positions upon the selective operation thereof by the knocker arms 154 and 236, respectively.

Furthermore, upon the return of the code wheel assembly 38 to the start, home, or null position and after the pawl pick-up lever 102 has released the pawls 90 and 190 due to the action of the pin 350 on the portion 420 of the lever 102, as shown by FIG. 18, the pin 332 of the reset wheel 62 then engages the stop 342 to release the locking posts 260 and 260A and thereafter the arm 49 of the inner wheel element 48 engages the stop 342 to define the home, start, or null position of the code wheel assembly 38.

REMOTE CODE CHANGE

Implementing a code change in the electromechanical decoder is accomplished by the changing of the presentation of the code post 260 relative to the inner code wheel 48, as shown in FIG. 2 and diagrammatically in FIGS. 5–10. The remote code change device includes a code change solenoid 450, the energization of which may be effected by the operator closing a switch 452, as shown in FIG. 1.

The code change solenoid includes a rod or plunger 454 actuated upon energization of the solenoid 450 to position a reset arm 456 operatively connected to the plunger 454 by a pin 458. The reset arm 456 is pivotally mounted on base 24 by a pin 460 and has positioned at the free end of the lever arm 456 a ratchet 462. The ratchet arm 456 upon energization of the solenoid 450 is actuated in a clockwise direction, as viewed in FIG. 5, about the pin 460 so as to position the ratchet 462 into operative relation with a code post pinion or gear 465 secured to the code post 260.

Upon de-energization of the solenoid 450, spring means therein, not shown, is effective to bias the plunger or rod 454 so as to actuate the code change arm 456 in a counterclockwise direction as viewed in FIG. 5 and the rack 462 out of operative relation with the pinion 465.

Thus, upon the code change solenoid 450 being energized by closure of a switch 452, the rack 462 is brought into proper operative relationship with the code change pinion 465 on the code post 260.

Thereafter, the code wheel assembly 38 may be stepped to the next position by momentary closure of the switch 360 or 362 whereupon the rack 462 is effective to rotate the pinion 465 and thereby the code post 260 180° into the next detent position.

Thereafter, the rack 462 may be selectively returned to the null position by the de-energization of the solenoid 450 by the opening of the control switch 452. In the event a code change is not required for any one code post, the code wheel assembly 38 may be merely stepped past to the next position without energization of the code change solenoid 450.

The change in the code remotely, i.e. with a closed decoder unit, can be accomplished only by a person having knowledge of the old and new codes. An electrical access to both the driver and code change solenoids is assumed in this operation. At the end of the code change operation, the code wheel assembly may be reset to a home position by the operator closing both the switches 360 and 362.

CODE ERASE

The code erase function of the electromechanical decoder serves to dissipate the code wheel into a unit when it is suspected that certain security conditions might have been violated. The code erase function may be initiated either electrically through use of a control solenoid 580 which may be energized by the operator closing a switch 590, as hereinafter explained, or the code erase function may be initiated automatically within the unit through operation of a cycle limiting means which forms the subject matter of a separate U.S. application Ser. No. 338,483, filed Jan. 17, 1964, by Peter J. Caruso, and assigned to The Bendix Corporation, assignee of the present invention.

The present invention relates to a code erase function as initiated by the operator.

The decoder mechanism of the present invention is shown in FIGS. 1 and 2 and includes a pair of code erase wheels, discs or plates 510 and 511 angularly movable on the shaft 34, but including suitable means for preventing axial movement of the code erase wheels 510 and 511 relative to the shaft 34.

The code erase wheel 510, as shown in FIG. 1, has teeth portions 514 angularly spaced apart by recessed portions 516 arranged about the periphery thereof while the code erase wheel 511 has identical teeth portions 518 equally spaced apart by recessed portions 520 and arranged in spaced relation about the periphery of the wheel 511.

Figure 4:
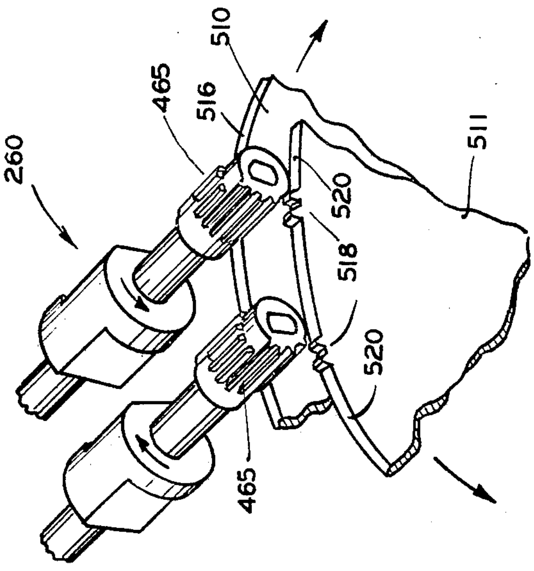
FIG. 4 is a fragmentary end view of the code erase mechanism of FIG. 3 showing the code posts in an erased position upon operation of the code erase wheels.
Figure 3:
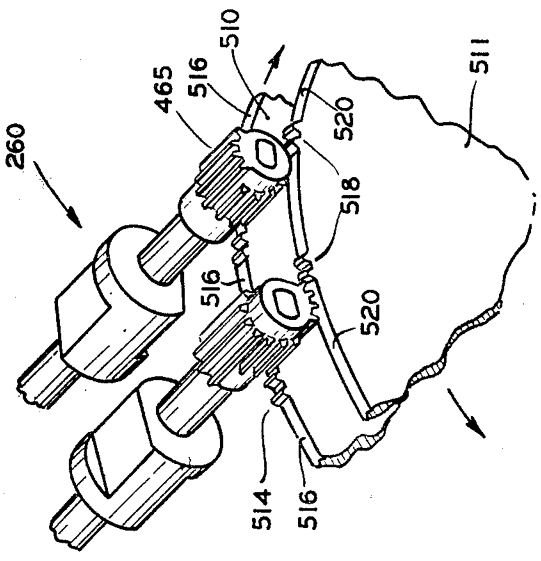
FIG. 3 is a fragmentary end view of the code erase mechanism showing code posts in a coded position and in an operative relation with the code erase wheels.

The code erase wheels 510 and 511 have the teeth 514 and 518 arranged for cooperation with pinions 465 affixed to the ends of the code posts 260, as shown in FIGS. 3, 4, and 5.

Each of the pinions 465 have parts of the teeth thereof cut away so that when the code post 260 is set for one function (for example, a "mark" function), the code erase wheel 511 may turn it and actuate it in a clockwise direction, as shown in FIGS. 3 and 4, when the code erase wheel 511 is actuated in a counterclockwise direction without actuating those code posts 260 which may be set for an opposite function (for example, the "space" function) while the other erase wheel 510 may actuate those other code posts 260 (set for the "space" function) in a counterclockwise direction without actuating the code post 260 set for the other function (for example, the "mark" function).

It will be seen then from an examination of the drawings 3 and 4 that through the foregoing erase action, the code posts 260 will be adjusted to identical neutral locking or erased positions shown in FIG. 4 from which it will be impossible to determine the original code position from an examination thereof by hostile personnel.

This erase position of the code posts 260 effected by the angular adjustment thereof ninety degrees (90°) in the clockwise or counterclockwise directions according to the code setting of the code posts 260 will cause the code posts 260 to lock up mechanically with the erase wheels 510 and 511 so as to permit no movement of the code wheel assembly 38 when the driver solenoids 146 and 232 are energized. Thus in order to unlock the erase mechanism, the decoder unit must be opened and the erase wheels 510 and 511 manually reset.

In order to effect this motion of the code erase wheels 510 and 511 in the clockwise and counterclockwise directions, there is provided a spring 525 positioned between the code erase wheels 510 and 511 and coiled about the shaft 34 so that one end 527 of the spring is connected at 529 in the erase wheel 510 while an opposite end 531 of the spring 525 is operatively connected at 533 in the code erase wheel 511. Thus, upon release of the erase wheels 510 and 511, the same are actuated in clockwise and counterclockwise directions, as indicated in FIG. 4.

In order to lock the code erase wheels 510 and 511 against the biasing force of the spring 525 and to effect a release of the erase wheels 510 and 511 under the biasing force of the spring 525, as desired, there are provided two plungers 530 and 530A of identical construction having end portions 534 and 534A and stem portions 535 and 535A, respectively, projecting therefrom.

The end portions 534 and 534A have a larger diameter than the stem portions 535 and 535A and are slidably mounted in openings 536 and 536A in the outer wheel element 42. There are affixed to the stem portions 535 and 535A of the plungers 530 and 530A in spaced relation to the end portions 534 and 534A suitable locking members 538 and 538A of equal diameter to that of the end portions 534 and 534A. The locking member 538 is secured to the stem portion 534 at 540 by a set screw 541 while the locking member 538A is secured to the stem portion 534A at 540A by a set screw 541A.

In assemblying the plungers 530 and 530A in operative relation in the code erase wheels 510 and 511, the end portion 534 of the plunger 530 is inserted in a circular opening 542 in the code erase wheel 510 and of equal diameter to that of the end portion 534 while the locking member 538 is inserted in a circular opening 543 in the code erase wheel 511 and of equal diameter to that of the locking member 538.

The other plunger 530A is similarly arranged having an end portion 534A inserted in a circular opening 543A in the code erase wheel 510 and of equal diameter to that of the end portion 534A while locking member 538A is inserted in a circular opening 543A in the code erase wheel 511 and of equal diameter to that of the locking member 538A.

The end portions 534 and 534A of the plungers 530 and 530A are thus positioned in slidable setting relation in the circular openings 542 and 542A in the code erase wheel 510 while the locking members 538 and 538A are positioned in slidable setting relation in the circular openings 543 and 543A.

A washer 545 is positioned on the stem portion 535 of the plunger 530 at the opposite side of the code erase wheel 511 from the spring 525 while a second washer 545A is similarly positioned on the stem portion 535A of the plunger 530A projecting through the code erase wheel 511A. Springs 550 and 550A extend about the stem portions 535 and 535A, respectively, between the washer 545 and 545A and a setting member 555 having openings 556 and 556A through which screw threaded portions 558 and 558A of the stem portions 535 and 535A extend for locking engagement by suitable nuts 560 and 560A, respectively.

As shown in FIG. 1, the circular opening 542 has a restricted arcuate slot 562 extending in a clockwise direction therefrom, as shown in FIG. 1, while the circular opening 542A has a similar restricted arcuate slot 562A extending in a clockwise direction therefrom. In distinction, in the code erase wheel 511 the circular slots 543 and 543A have restricted arcuate slots 565 and 565A extending in a counterclockwise direction therefrom.

The arcuate slots 562 and 562A and the arcuate slots 565 and 565A have a width sufficient to receive the stems 535 and 535A of the plungers 530 and 530A, respectively, and permit the free passage thereof in the restricted arcuate slots. In distinction, the end portions 534 and 534A, as well as the locking members 538 and 538A are of such a large diameter as not to permit the passage thereof in the restricted arcuate slots.

In mounting the code erase wheels 510 and 511 on the plungers 530 and 530A, the code erase wheel 510 is angularly positioned in a clockwise direction, as viewed in FIG. 1, relative to the code erase wheel 511 so as to tension the spring 525 connected therebetween and position the circular openings 542 and 543 in axial alignment with the end portion 534 and locking member 538 of the plunger 530, as well as bring the circular openings 542A and 543A in axial alignment with the end portion 534A and locking member 538A of the plunger 530A. The erase wheels 510 and 511 are then locked with the portions 534 and 534A and members 538 and 538A in said circular openings and with the end portions 534 and 534A being further slidably positioned in the circular openings 536 and 536A of the outer wheel element 42.

Further, the actuating member 555 has a slot portion 570 slidably mounted on a key portion 572 of the shaft 34 so that upon axial actuation of the setting member 555 on the key portion 572 of the shaft 34 towards the code erase wheel 511, the springs 550 and 550A will be tensioned and the plungers 530 and 530A being directly connected to the member 555 will be actuated inwardly towards the outer wheel element 42 of the code wheel assembly whereupon the locking portions 534 and 534A and the members 538 and 538A of the plungers 530 and 530A will be similarly axially positioned relative to the code erase wheels 510 and 511 until the arcuate slots 562 and 562A in the code erase wheel 510 are adjacent the stem portions 535 and 535A between the end portions 534 and 534A and the locking members 538 and 538A while the arcuate slots 565 and 565A in the code erase wheel 511 are adjacent the stem portions 535 and 535A of the plungers 530 and 530A between the locking members 538 and 538A and the washer 545 and 545A at the opposite side of the code erase wheel 511.

Upon the plungers 530 and 530A being so adjusted, the code wheels 510 and 511 under the biasing force of the spring 525 will be actuated in opposite senses with the code erase wheel 510 being driven in a clockwise direction, as viewed in FIGS. 3 and 4, while the code erase wheel 511 will be driven in a counterclockwise direction, as viewed in these FIGURES under the biasing force of the spring 525. This action will then cause the teeth 514 and 518 to engage the pinions 465 of the code posts 260 to effect the angular adjustment thereof to the erase position shown in FIG. 4.

To effect the foregoing operation of the code erase mechanism, there is provided an actuating arm 571 pivotally mounted at 573 and having end portions 575 arranged to operatively engage a circular portion 577 of the actuating member 555 to effect the operation thereof against the biasing forces of the spring 550 and 550A. This latter operation is effected by a solenoid 580 having a plunger 582 arranged to be operatively connected to the opposite end of the actuating lever 571 by a pin 584 at 586. The solenoid 580 may be rendered effective for actuating the member 555 through the lever 571 upon energization thereof which may be controlled by a code erase control switch 590, as shown in FIG. 1.

OPERATION

The electromechanical decoder of the present invention is a device which requires an input of a special digital code to obtain a desired end function, in this case, closure of the control switch 398. Successful operation requires a sequential or serial input of a digital code which matches a code previously set in the unit. Sending the unit an improper code results in one or more of the code posts 260 being retained in a position effective to lock the inner wheel element 48 to the outer wheel elements 40 and 42 so that the code wheel assembly 38 upon completion of the improper code input instead of being in a condition to effect closure of the control switch 398, the code wheel assembly 38 is restrained from effecting such operation by the arm 49 engaging the stop 342 so as to prevent further step actuation of the shaft 34.

CODE WHEEL OPERATION

In the device disclosed herein, the code is set in the code wheel assembly 38 by a preadjustment of a plurality of code posts 260 (in the illustrated device, eighteen code posts may, for example, be provided, but the number thereof may be varied as may be required) and additional code posts 260A (two of which are shown by way of example). These code posts 260 and 260A are placed near the periphery of the outer code wheel elements 40 and 42. The code wheel assembly 38 is driven by a set of two solenoids 146 and 232, one solenoid 232 being designated for code purposes as "mark" and other solenoid 146 being designated "space".

The inner wheel element 48 is mounted concentric with the main shaft 34 and is free to rotate in relation to it. The inner wheel element 48 is located relative to and locked together with the outer wheel elements 40 and 42 via the code post 260. The inner wheel element 48 is prevented from rotating beyond the 18th position by a protruding arm 40 which operatively engages stop 342 at that point.

Following a correct message, when the inner wheel element 48 is displaced relative to the outer wheel elements 40 and 42, proper wheel alignment upon return is obtained by a light spring 50 preloaded between the outer and inner wheel elements. The action of the mechanism described herein provides for a serial-input parallel-readout characteristic. This approach yields no information on whether any bit being inserted is correct or not until the 18th bit advance motion is attempted. Only at this point, with the inner wheel element 48 at its stop point with arm 49 engaging the stop 342, will the code input be in effect sampled for accuracy. If all the code bit inputs have been proper, the inner wheel element 48 and outer wheel elements 40 and 42 will be disengaged after the 18th bit input, and the outer wheel elements 40 and 42 will be permitted to advance to closure of the control switch 398 through operation of the shaft 34 upon proper operation of the auxiliary code posts 260A on the 19th and 20th bits. Should any or all code bits be incorrect, the inner and outer wheel elements will be in a locking relation and the stopping of the inner wheel element 48 by arm 49 engaging arm 342 will also prevent the outer wheel elements from further motion.

CODE POSTS

The main code posts 260 are preset prior to unit closure to represent a series of digital 1 or 0 bits. Each code post 260 is set for either a 1 or 0 bit merely by rotating it to either of two positions, each 180° away from the other. They are held in position by the spring loaded ball detents 307.

FIGS. 12 and 13 show how the code posts 260 may be operated so as to discern between a proper and an improper bit. Assuming the code post 260 is set for "mark" operation, pulsing the mark solenoid 232 will move the code post 260 in the proper direction, as shown in FIG. 12 to place the indent portion 262 of the member 261 directly over the inner wheel 48. That particular code post 260 thus will no longer contribute to the locking action of the inner wheel element 48 to the outer wheel elements 40–42. If, however, the "space" solenoid 146 is pulsed at that same position of the code wheel assembly 38, the element 269 of the member 261 will be actuated into locking relation with the indent portion 267 of the flange portion 265 of the inner wheel 48, as shown in FIG. 13, and the code post 260 will remain a contributor to the locking action effected thereby between the inner and outer wheel elements.

As distinguished from the main code post 260, the auxiliary code posts 260A in the 19th and 20th positions of the code wheel assembly, are special posts, and as shown in FIG. 41, in the neutral position are in an unlocked relation with respect to the inner and outer wheel elements of the code wheel assembly 38. Thus a proper bit will cause the auxiliary code posts 260A to remain unlocked while an improper bit will cause the code posts 260A to lock the inner and outer wheel elements. This action will prevent any further advance of the code wheel assembly and will deny further access to any code post in the unit. As shown herein, the 19th and 20th bits do not have remote change capability but the same may be changed manually by rotating the post 180°.

The decoding mechanism illustrated herein is arranged for receiving twenty total operating bits, 18 for decoding in operating the main code posts 260 and the remaining two for effecting actuation of the switch 398 upon the proper operation of the code posts 260A. The unit will receive and store all 18 bits. If all are correct, the inner wheel 48 releases the outer wheel elements and closure of the switch 398 occurs upon the 19th and 20th bits operating the code posts 260A being correct. The inner wheel element 48 always reaches a stop at the completion of the 18th bit.

Therefore, if any or all of the 18 bits are false, the outer wheel elements 40 and 42 are locked to the inner wheel element 40 so as to prevent completion of the decoding operation. The control switch 398 is so arranged that prior to the 19th bit insertion, it is locked by the action of the locking device 407. A proper 19th bit is effective to unlock the device 407 whereupon a subsequent proper 20th bit will cause the mechanism to close the switch 398 while an improper 19th or 20th bit will cause the auxiliary post 260A to lock the outer wheel elements 40–42 to the inner wheel element 48 and prevent actuation of the switch 398. The switch may, of course, be designed to suit various requirements.

REMOTE CODE CHANGE

The electromechanical decoders herein disclosed includes novel means whereby a change in the code for operating the same may be effected through a remote control means. During such code change operation, the code wheel assembly 38 is advanced position by position through selective operation of the switch mechanism 360 and 362.

If a change in code is required, the code change solenoid 450 may be energized by closure of the switch 452. The ratchet 462 will then be positioned into operating relation with the pinion 465 of the selected code post 260 so that, as shown in FIGS. 5–10, motion of the code post pinion 465 as the code post assembly 38 is rotated passed the code change rack 462 is effective to revolve the code post 180°, for example, from a "mark" to a "space" or "space" to a "mark" adjusted position.

CODE ERASE

The decoder mechanism disclosed herein includes the further feature of novel means to dissipate the code set in the unit whenever it may be suspected that certain security conditions are being violated. The code erase mechanism, as shown in FIGS. 1 and 2, may be initiated by the operator closing a switch 590 for effecting energization of the code erase solenoid 580 which is thereupon effective to cause the release of the code erase wheels 510 and 511 under the biasing force of the spring 525 to actuate the pinions 465 of the code post 260, as shown in FIGS. 3 and 4, to effect the code erase function.

As shown in FIGS. 3 and 4, the pinion 465 has part of the teeth cut out so that when the code post 260 is set for a "mark" function, the rear erase wheel 511 only may turn it and actuate the code post 260 in a clockwise direction, as shown in FIG. 4, while when the code post 260 is set for a "space" function, only the front erase wheel 510 can turn it and actuate the code post 260 in a counterclockwise direction, as shown in FIG. 4.

Releasing the two erase wheels 510 and 511 to effect the erasing function is accomplished by the positioning of two spring loaded plungers 530 which may be actuated to a release position by operation of the arm 570 bearing upon the circular member 577 of the actuating member 555. Such actuation of the arm 570 may be effected by energization of the control solenoid 580 by the closing of the switch 590.

Such release of the code erase mechanism will effect rotation of the code post 260 ninety degrees (90°) in a clockwise or in a counterclockwise direction according to the code setting thereof so that in the erase position, as shown in FIG. 4, all of the code posts 260 are oriented in the same direction totally destroying all traces of the initial setting.

When thus actuated to the erase position, the code post 260 will lock up mechanically with the erase wheels 510 and 511 so as to permit no movement of the code wheel assembly 38 when the driver solenoids 146 and 232 are energized. To unlock the mechanism, the unit must be opened and the erase wheels 510 and 511 manually reset.

SOLENOID ELECTRICAL AND AUDIBLE NOISE MASKING

The code input information, irrespective of whether each code post 260 has been properly actuated to allow closure of the switch 262 will be stored until the advancing motion of the outer wheel elements 40 and 42 after the 18th bit input is attempted. It can be seen, therefore, that the amount of work expended to move any code post 260 is nominally the same whether actuated by the "mark" or "space" solenoids 232 and 146, respectively. That is to say, the orientation or coding of the code post 260 has no effect on the effort involved in the displacement thereof during decoding, whether a correct or incorrect decoding bit is applied.

In this fashion, the electrical emanation of the solenoids 146 and 232 while not actually masked or eliminated, have no effect on the security problem when considering it in relation to code deduction possibilities. By the same token, since whatever audible noise generated during decoding is always the same for each position of the code posts 260 monitoring the audible noise also yields no code deduction information.

DECODING OPERATION

In performing a decoding operation, the following sequences of operation take place:

a. Advancing or Stepping of Code Wheel Assembly

Solenoid (146 or 232) retracts plunger upon application of power and thereby:

1. Advances pawl (90 or 190) to next position on ratchet wheel 36.
2. Stores energy in code wheel advance spring (126 or 226).
3. Pushes code post 260 through operation of bell crank actuator (154 or 236).

Upon removal of power from the solenoid (146 or 232):

1. Code wheel advance spring (126 or 226) advances code wheel assembly 38 through action of pawl (90 or 190) on ratchet wheel 36.
2. Energy is stored in code wheel return spring 70.

The code wheel assembly 38, while progressing from the first to the 18th bit positions will advance at each actuation whether the code bit inserted is correct or not.

When the 18th position or station of the code wheel assembly 38 has been reached, the inner and outer wheels are still "together".

If the code input has been correct:

1. The inner and outer wheel elements 48 and 40–42 still maintain the same position relative to each other.
2. No code posts 260 are engaged in grooves 267 and 268 of the inner wheel element 48 and the outer wheel elements 40–42 are mechanically free of the inner wheel element 48.
3. The arm 49 of the inner wheel element 48 is normally against the stop 342.
4. No motion of the control switch 398 has taken place and the gear portion 395 of the interrupter gear 380 is not in a position to initiate actuation of the control switch 398.
5. The outer wheel elements 40–42 are now in condition for further advance so that, upon proper actuation of the auxiliary code post 260A in the 19th position, such code post 260A remains in an unlocking relation with the inner wheel element 48, whereupon the outer wheel elements 40 and 42 may be angularly positioned against the opposing force of the light spring 50 held by the inner wheel element 48 upon the 19th step actuation of the shaft 34 causing the pin 411 carried by the interrupter gear 380 to actuate the device 407 so as to unlock the rotatable member 401 of the control switch 398.

6. Thereafter, upon a proper actuation of the auxiliary code post 260A in the 20th position, such code post 260A remains in an unlocking relation with the inner wheel element 48, whereupon the outer wheel elements 40 and 42 may be further angularly positioned against the opposing force of the light spring 52 by the 20th step actuation of the shaft 34 causing the gear teeth portion 395 of the interrupter gear 380 to engage the teeth of the pinion 396 and close the control switch 398.

If the code input has not been correct:

1. The inner wheel element 48 and the outer wheel elements 40–42 maintain their relative positions to each other in steps 1–18.
2. Any number of code posts 260 are still engaged in the grooves 266 of the inner wheel element 48.
3. The arm 40 of the inner wheel element 48 is normally against the stop or arm 342.
4. No motion of control switch 398 has taken place.
5. The outer wheel elements 40 and 42 are locked against further advance. End output actuation cannot take place.
6. Similarly, if the code input in steps 1–18 has been correct, either an improper 19th or 20th bit will cause the auxiliary code posts 260A to lock the inner wheel element 48 to the outer wheel elements 40 and 42 so as to prevent any further advance of the shaft 34 whereupon the end output actuation of the control switch 398 cannot take place.

b. Switch Actuation

Assuming correct code input, the code wheel assembly 38 will advance on the 20th bit actuation to effect the following sequence of operation.

1. The gear teeth portion 395 of the interrupter gear 380 mesh with switch pinion 396 to rotate switch 398 to a circuit closing position for effecting firing operation of the missile or controlled object.

RESET MODES

Once the code wheel assembly 38 is moved off the safe or home position, a mechanism is provided to return it to the home position.

In the illustrated electromechanical decoder, reset of the mechanism to the home position is accomplished by the device 102 lifting the two driver pawls (90 and 190) from the ratchet 36, as shown in FIG. 17, so as to allow the energy stored in the wheel return spring 70 to rotate the code wheel assembly 38 to the safe, null, or home position.

The initiation of this action is accomplished by the simultaneous energization of both driver solenoids 146 and 232 by the closing of switches 360 and 362 so as to cause both pawl actuating mechanisms 81 and 82 to be actuated to the operative position shown in FIG. 17 whereupon the portion 410 of the pawl lift device 102 under the biasing force of spring 412 engages the end portions 100 and 200 of the pawls 90 and 190 to lift the pawls from operative relation with ratchet 36 whereupon the code wheel assembly 38 and the shaft 34 is returned to the home position, as shown in FIG. 18.

The electromechanical decoder may be so designed with respect to size and weight as to be carried by an aircraft, missile or warhead and the control switch 398 may be arranged so as to control the firing of the missile or projectile borne thereby, while the switches 360, 362, 415, 452, and 590 may be controlled through a telemetering link, computer, or control system of a suitable type, not shown.

Although only one embodiment of the invention has been illustrated and described, various changes in the form and relative arrangements of the parts which will now appear to those skilled in the art may be made without departing from the scope of the invention. Reference is, therefore, to be had to the appended claims for a definition of the limits of the invention.

What is claimed is:

1. A decoder mechanism comprising a code wheel assembly including a first wheel element and a second wheel element, a main code post means normally positioned for locking the first and second wheel elements in driving relation, selectively operable means for actuating the main code post means in a predetermined sense for unlocking the first and second wheel elements, auxiliary code post means effective upon the first and second wheel elements being in an unlocked relation, said auxiliary code post means being operable by said selectively operable means in one sense for locking said first and second wheel elements and in another sense to retain said first and second wheel elements in said unlocked relation, and means actuated by one of the wheel elements for performing a control function upon the first element being retained in said unlocked relation with the second element.

2. The combination defined by claim 1 in which the main and auxiliary code post means may be selectively adjusted so as to change the predetermined senses of actuation for effecting the unlocking of the first and second wheel elements.

3. The combination defined by claim 1 in which said auxiliary code post means includes a pair of locking portions positioned thereon intermediate opposite ends thereof and in angular spaced relation, said pair of locking portions being so arranged that the auxiliary code post means may be angularly preset in one sense so as to position one of the pair of locking portions selectively into operative relation with one of said wheel elements to lock said one wheel element with the other wheel element upon actuation of the auxiliary code post means in one predetermined sense and to retain the one wheel element in an unlocking relation with the other wheel element upon actuation of the auxiliary code post means in another sense, and said pair of locking portions being so arranged that the auxiliary code post means may be angularly preset in another sense so as to position the other of the pair of locking portions selectively into operative relation with said one wheel element to lock said one wheel element with the other wheel element upon actuation of the auxiliary code post means in said other sense and to retain the one wheel element in an unlocked relation with the other wheel element upon actuation of the auxiliary code post means in said one sense.

4. A decoder mechanism comprising a rotatable wheel assembly including a first wheel element and a second wheel element, a plurality of main code post means slidably mounted in the first wheel element for locking the second wheel element to the first wheel element, means for selectively actuating the main code post means to unlock the first wheel element from the second wheel element, auxiliary code post means slidably mounted in the first wheel element and effective upon the first and second wheel elements being in an unlocked relation to be actuated so as to lock the second wheel element to the first wheel element, and said auxiliary code post means being selectively operable by said actuating means in one sense for locking said first and second wheel elements and in another sense to retain said first and second wheel elements in said unlocked relation.

5. The combination defined by claim 4 including motor means for selectively actuating each of the main and auxiliary code post means in said locking and unlocking senses, and other means conditioned by operation of said motor means for effecting a step actuation of the wheel assembly upon completion of each of the selective actuations of said main and auxiliary code post means.

6. A decoder mechanism comprising a rotatable wheel assembly including a first wheel element and a second wheel element, a plurality of main code posts normally positioned so as to lock the second wheel element to the first wheel element in driving relation, an auxiliary code post normally positioned in unlocking relation between the first and second wheel elements, a pair of actuating means for selectively operating the main and auxiliary code posts in opposites senses, said main code posts including preset adjustable means for unlocking the second wheel element from the first wheel element dependent upon the selected sense of actuation of the main code posts by said actuating means, said auxiliary code post including preset adjustable means for locking the second wheel element to the first wheel element dependent upon the selected sense of actuation of the auxiliary code post by said actuating means, and means operably connected to the first wheel element for effecting a control function upon the first wheel element being unlocked from the second wheel element upon completion of a predetermined decoding sequence of operation of said main and auxiliary code posts by said actuating means.

7. The combination defined by claim 6 including a ratchet drivingly connected to the first wheel element, a pair of pawls cooperating with said ratchet, each of said pawls being carried by a pivotal member and operable to step actuate the wheel assembly so as to selectively position the code posts for actuation by said selectively operable actuating means, spring means tensioned by the stepping actuation of the wheel assembly, control means releasably engaging said pivotal members and arranged to be released thereby upon simultaneous operation of said pivotal members so as to position said pair of pawls out of cooperative relation with said ratchet and thereby render the spring means effective for returning the wheel assembly to a start position, and means carried by said first wheel element for actuating said control means to a reengaging relation with said pivotal members upon the wheel assembly being returned to the start position by said spring means.

8. An electromechanical decoder comprising a code wheel assembly, a ratchet wheel and a pair of actuating pawls, a pair of angularly movable members for pivotally supporting said pawls in a cooperative relation with said ratchet wheel for rotatably positioning the code wheel assembly in a step action, a pair of solenoids selectively operable for actuating each of said pawls relative to said ratchet wheel, a spring conditioned by the operation of each solenoid and effective to cause each pawl to step actuate the ratchet wheel and thereby the code wheel assembly to a second adjusted position under the biasing force of said spring upon de-energization of the selected solenoid, another spring conditioned by the stepping action of the code wheel assembly, a pawl lift means bearing upon each of said angularly movable members and effective for cooperating with a portion of each of said actuating pawls upon the simultaneous operation of each of said pair of solenoids for causing said actuating pawls to be positioned out of cooperating relation with the ratchet wheel so as to render said other spring effective for returning the code wheel assembly to a start position.

9. The combination defined by claim 8 in which the code wheel assembly includes an inner wheel element and an outer wheel element, means for locking the inner wheel element to the outer wheel element in driving relation, means selectively operable by the solenoids for actuating said locking means in locking and unlocking senses dependent upon the selection of the actuating means, and means operable by the outer wheel element for actuating the pawl lift means to an inoperative relation with said pair of actuating pawls upon the code wheel assembly being returned to the start position by said other spring.

10. For use with a pair of electrical circuits that may be energized one circuit at a time in any sequential order, apparatus for determining if said circuits are energized in a predetermined order, said apparatus comprising a code wheel including actuatable means for storing said predetermined order therein, means defining a start position for said code wheel, spring means for biasing said code wheel toward said start position, a ratchet wheel operatively connected to said code wheel, pawl means, a pair of angularly movable members for pivotally supporting said pawl means, motor means electrically operated by said circuits for positioning said angularly movable members and thereby operating said pawl means, said pawl means being normally in an operative relation with said ratchet wheel for rotating said ratchet wheel and said code wheel in a direction opposed to said spring means upon operation of said movable members by said motor means, means selectively operated by said motor means for actuating said storing means in said code wheel, means operable by said code wheel for effecting a control function upon the actuation of said storing means being in said predetermined order, means for lifting said pawl means out of said normal operative relation with said ratchet wheel so as to render said spring means effective for rotating said ratchet wheel and said code wheel toward said start position, said lifting means including a portion bearing upon each of said angularly movable members, and said angularly movable members being so arranged in relation to said portion of the lifting means as to render said lifting means effective upon simultaneous energization of said pair of electrical circuits.

11. The combination defined by claim 10 including other means operable by said code wheel upon return of said code wheel to said start position under biasing force of said spring means for returning said lifting means to an inoperative relation.

12. A decoder mechanism comprising a code wheel assembly including a first wheel element and a second wheel element, a plurality of main code posts preset for locking the first and second wheel elements in driving relation, selectively operable means for actuating the main code posts sequentially in opposite senses, means for releasably locking the main code posts in the actuated senses, said main code posts being effective for unlocking the first and second wheel elements upon completion of the actuation thereof in a predetermined order and sense, a plurality of auxiliary code posts preset in an unlocking relation with the first and second wheel elements, said selectively operable means being rendered effective for actuating the auxiliary code posts sequentially in opposite senses upon the first and second wheel elements being unlocked by the aforesaid actuation of the main code posts in said predetermined order and sense, said auxiliary code posts being effective for locking the first and second wheel elements upon actuation of at least one of said auxiliary code posts in a predetermined locking sense, and said auxiliary code posts being effective for retaining the first and second wheel elements in an unlocking relation upon actuation thereof in predetermined unlocking senses, and means actuated by one of the wheel elements for providing a control function upon the first wheel element being unlocked from the second wheel element upon completion of actuation of said main and auxiliary code posts in a predetermined order and sense.

13. A decoder mechanism comprising a code wheel assembly including a first wheel element and a second wheel element, a plurality of code posts carried by the first wheel element and preset for locking the first and second wheel elements in driving relation, a pair of selectively operable means for actuating the code posts sequentially in opposite senses, means to step actuate the first wheel element and thereby the second wheel element locked thereto so as to sequentially position the code posts for actuation by said selectively operable actuating means, spring means conditioned by the selectively operable actuating means for operating the step actuating means, means for releasably locking the code posts in the actuated sense, said code posts being effective for unlocking the first and second wheel elements upon completion of the actuation of the code posts in a predetermined order and sense, control means operatively positioned so as to raise said step actuating means out of operative relation with said first wheel element, means for biasing said code wheel assembly to a start position, means for actuating said control means to said operative position, said actuating means being rendered effective by the simultaneous operation of said pair of selectively operable means so as to thereby raise said step actuating means out of operative relation with the first wheel element to render said biasing means effective to return the code wheel assembly to the start position, reset means for releasing said code posts and locking means, and means carried by the code wheel assembly for rendering the reset means operable upon the code wheel assembly approaching the start position under force of said biasing means.

14. The combination defined by claim 13 in which said reset means includes a disc concentrically mounted relative to the code wheel assembly, and said locking means including pivotal members carried by the first wheel element for releasably locking the code posts in the actuated sense, said disc having peripheral indent portions therein cooperating with said locking members, a spring drivingly coupling the disc to the first wheel element, a stop defining a start position for said code wheel, and the disc including an arm for engaging said stop and angularly moving the disc relative to said code wheel assembly to actuate the locking members so as to release the code posts upon the code wheel assembly approaching the start position under the force of said biasing means.

15. The combination defined by claim 14 including means carried by the first wheel element and operable for actuating said control means from said operative position so as to release said step actuating means into operating relation with said first wheel element after the reset means has been actuated by said stop so as to release the code post locking means.

16. A decoder mechanism comprising a code wheel assembly including a first wheel element and a second wheel element, a shaft drivingly connected to the first wheel element, a plurality of main code posts carried by the first wheel element and preset for locking the first and second wheel elements in driving relation,
a plurality of auxiliary code posts carried by the first wheel element and preset in an unlocking relation to the first and second wheel elements,
said auxiliary code posts being selectively operable in one sense for locking the first and second wheel elements in driving relation and operable in another sense for retaining the first and second wheel elements in said unlocking relation,
a spring for coupling the first wheel element to the second wheel element,
selectively operable means for actuating the main code posts sequentially in opposite senses,
said selectively operable means being effective for actuating said auxiliary code posts in an opposite sense upon said first and second wheel elements being in an unlocked relation upon completion of the actuation of the main code posts,
said auxiliary code posts being effective for retaining the first and second wheel elements in said unlocking relation upon completion of the actuation of the auxiliary code posts in a predetermined order and sense,
said main code posts being effective for unlocking the first and second wheel elements upon completion of the actuation of said main code posts in a predetermined order and sense,
a ratchet wheel operatively connected to said shaft,
pawl means operated by said selectively operable means for rotating said ratchet wheel so as to position said code wheel assembly for said sequential actuation of the code posts,
means for releasably locking the main and auxiliary code posts in the actuated sense,
means for limiting the angular movement of the second wheel element relative to the first wheel element upon the completion of the actuation of said main and auxiliary code posts in said predetermined order and sense,
and control means operable by the shaft upon angular movement of said first wheel element relative to said second wheel element and upon the first wheel element being unlocked from the second wheel element by the actuation of said main and auxiliary code posts in said predetermined order and sense.

17. A decoder mechanism comprising a code wheel assembly including
a first wheel element and a second wheel element,
a shaft drivingly connected to the first wheel element,
a plurality of code posts carried by said first wheel element and preset for locking the first and second wheel elements in driving relation,
a spring for coupling the first wheel element to the second wheel element,
a pair of selectively operable means for actuating the code posts sequentially in opposite senses,
a ratchet wheel operatively connected to said shaft,
pawl means operated by said selectively operable means for rotating said ratchet wheel so as to position said code wheel assembly for said sequential actuation of the code posts,
means for releasably locking the code posts in the actuated sense,
said code posts being effective for unlocking the first and second wheel elements upon completion of the actuation of said code posts in a predetermined order and sense,
means for limiting the angular movement of the second wheel element relative to the first wheel element upon the completion of the actuation of said code posts in said predetermined order and sense,
control means operable by the shaft upon angular movement of said first wheel element relative to said second wheel element upon the first wheel element being unlocked from the second wheel element,
said code posts being effective for retaining the first and second wheel elements in a locked relation upon completion of actuation of said code posts in an order and sense other than as predetermined so as to prevent operation of said control means by said shaft,
means for lifting said pawl means from operative relation with said ratchet wheel upon simultaneous actuation of said pair of selectively operable means,
and spring means being effective upon the lifting of the pawl means for returning the code wheel assembly and shaft to a start position.

18. The combination defined by claim 17 including reset means for releasing the code post locking means,
and said reset means being operable upon the code wheel assembly being returned to said start position by said spring means.

19. The combination comprising a first wheel element,
a shaft drivingly connected to the first wheel element,
stop means defining a start position for said first wheel element,
a first spring for biasing said first wheel element toward said start position,
a second wheel element angularly movable on said shaft,
a second spring for drivingly coupling the first wheel element to the second wheel element,
releasable locking means for directly connecting the first wheel element to the second wheel element,
a ratchet wheel operatively connected to said shaft,
a pair of pawls normally in an operative relation with said ratchet wheel,
a pair of angularly movable members for pivotally supporting said pawls,
a pick-up device for lifting the pawls out of said operative relation with the ratchet wheel,
a pair of selectively operable solenoids,
means operatively connecting said solenoids to said angularly movable members for selectively positioning said pawls into a driving relation with said ratchet wheel upon selective energization of said solenoids,
a third spring means operatively connected to said angularly movable members for acting in opposition to said solenoids upon energization thereof and effective upon de-energization of said solenoids for actuating said members and thereby said pawls in said driving relation with said ratchet wheel so as to angularly position the shaft in a direction opposed to said first spring,
said pick up device bearing upon said pair of angularly movable members and rendered effective upon simultaneous energization of said solenoids for rendering said pick-up device operative for engaging end portions of said pawls for lifting the pawls out of said operative relation with the ratchet wheel, and said first spring being thereupon rendered effective upon the lifting of the pawls by said pick-up device out of said operative relation with said ratchet wheel for returning the first wheel element to the start position defined by said stop means.

20. The combination comprising a shaft, a driven member connected to the shaft, stop means defining a start position for said driven member, a spring means for biasing said driven member toward said start position, a ratchet wheel drivingly connected to the shaft, pawl means normally operatively positioned in relation to said ratchet wheel and operative in one sense for rotating said ratchet wheel and driven member in a direction opposed to said spring means, a device for lifting said pawl means out of operative relation with said ratchet wheel, said pawl means including a pair of arcuate arms for controlling said lifting device, said lifting device bearing upon said control arms and being rendered effective only upon a simultaneous operation of said pawl means for rendering the lifting device effective for raising the pawl means out of operative relation with said ratchet wheel whereupon the spring means is rendered effective for returning the driven member to the start position defined by said stop means.

21. The combination comprising a shaft, a driven member connected to the shaft, stop means defining a start position for said driven member, a spring for biasing said driven member toward said start position, a ratchet wheel drivingly connected to the shaft, pawl means normally operatively positioned in relation to said ratchet wheel and operative in one sense for rotating said ratchet wheel and driven member in a direction opposed to said spring, a device for lifting said pawl means out of operative relation with said ratchet wheel, said pawl means including a surface normally in operative relation with said lifting device so as to render the lifting device ineffective for lifting the pawl means out of operating relation with said ratchet means, and said surface being effective upon operation of the pawl means in another sense to release said device so as to render the device effective for lifting the pawl means out of operative relation with said ratchet wheel whereupon the spring is rendered effective for returning the driven member to the start position.

22. A decoder mechanism comprising a rotatable code wheel assembly including a first wheel element and a second wheel element, a plurality of code posts normally positioned so as to lock the second wheel element to the first wheel element in driving relation, a pair of actuating means for selectively operating the code posts in opposite senses, said code posts including preset means for unlocking the second wheel element from the first wheel element dependent upon the selected sense of actuation of the code posts by said actuating means, each of said code posts including adjustable means for angularly positioning said preset means from a first position to a second position to change the sense of actuation of the code post by said actuating means to effect the unlocking of the second wheel element from the first wheel element, means operably connected to the first wheel element for effecting a control function upon the first wheel element being unlocked from the second wheel element upon completion of a predetermined sequence of operation of said actuating means, and means for actuating the adjustable means of at least one of said code posts to change the setting of said preset means.

23. A decoder mechanism comprising a rotatable code wheel assembly including a first wheel element and a second wheel element, a plurality of code posts normally positioned so as to lock the second wheel element to the first wheel element in driving relation, a pair of actuating means for selectively operating the code posts in opposite senses, said code posts including preset means for unlocking the second wheel element from the first wheel element dependent upon the selected sense of actuation of the code posts by said actuating means, each of said code posts including adjustable means for angularly positioning said preset means from a first position to a second position to change the sense of actuation of the code post by said actuating means to effect the unlocking of the second wheel element from the first wheel element, means operably connected to the first wheel element for effecting a control function upon the first wheel element being unlocked from the second wheel element upon completion of a predetermined sequence of operation of said actuating means, and operator-operative means for selectively actuating the adjustable means of each of said code posts so as to change the predetermined decoding sequence of operation of said code posts.

24. A decoding mechanism comprising a rotatable code wheel assembly including a first wheel element and a second wheel element, a plurality of code posts normally positioned so as to lock the second wheel element to the first wheel element in driving relation, a pair of actuating means for selectively operating the code posts in opposite senses, said code posts including preset means for unlocking the second wheel element from the first wheel element dependent upon the selected sense of actuation of the code posts by said actuating means, each of said code posts including adjustable means for angularly positioning said preset means from a first operative position to a second locking position, means operably connected to the first wheel element for effecting a control function upon the first wheel element being unlocked from the second wheel element upon completion of a predetermined decoding sequence of operation of said actuating means, and means for actuating the adjustable means of said code posts so as to position the preset means of the code posts from said first operative position to said second locking position to erase the predetermined decoding sequence of operation.

25. A decoding mechanism comprising a rotatable code wheel assembly including a first wheel element and a second wheel element,
a plurality of code posts normally positioned so as to lock the second wheel element to the first wheel element in driving relation,
a pair of actuating means for selectively operating the code posts in opposite senses,
said code posts including preset means for unlocking the second wheel element from the first wheel element dependent upon the selected sense of actuation of the code posts by said actuating means,
each of said code posts including adjustable means for angularly positioning said preset means from a first operative position to a second locking position,
means operably connected to the first wheel element for effecting a control function upon the first wheel element being unlocked from the second wheel element upon completion of a predetermined decoding sequence of operation of said actuating means,
means for actuating the adjustable means of said code posts so as to position the preset means of the code posts from said first operative position to said second locking position to erase the predetermined decoding sequence of operation,
and operator-operative means for rendering said erasing means effective.

26. An electromechanical decoder comprising a rotatable code wheel assembly including
a first wheel element and a second wheel element,
a plurality of code posts normally positioned so as to lock the second wheel element to the first wheel element in driving relation,
a pair of actuating means for selectively operating the code posts in opposite senses,
said code posts including preset means for unlocking the second wheel element from the first wheel element dependent upon the selected sense of actuation of the code post by said actuating means,
each of said posts including adjustable means for angularly positioning said preset means from a first position to a second position so as to change the sense of actuation of the code post by said actuating means to effect the unlocking of the second wheel element from the first wheel element,
means operably connected to the first wheel element for effecting a control function upon the first wheel element being unlocked from the second wheel element upon completion of a predetermined sequence of operation of said actuating means,
a ratchet arm for selectively actuating the adjustable means of each of said code posts for changing the setting of the preset means and thereby the predetermined decoding sequence of operation,
a solenoid for selectively actuating the ratchet arm into operative relation with the adjustable means of said code posts,
and operator-operative means for controlling said solenoid.

27. The combination defined by claim 26 including a pair of discs rotatably mounted in coaxial relation to said rotatable code wheel assembly,
a spring operatively connected between said discs to angularly bias the discs in opposite senses,
a pair of posts slidably mounted in the first wheel element for operatively connecting the pair of discs in locked relation one with the other against the biasing force of said spring and to said first wheel element,
said pair of discs including peripheral teeth arranged in operative relation with the adjustable means of said code posts,
means for actuating said pair of posts to release said discs from said locking relation one with the other under the biasing force of said spring to cause the peripheral teeth of said discs to actuate the adjustable means of said code posts so as to position the preset means of the code posts from an operative position to a neutral locking position so as to erase the predetermined decoding sequence of operation,
and means for controlling the operation of said last-mentioned actuating means.

28. A decoder mechanism comprising a rotatable code wheel assembly including
a first wheel element and a second wheel element,
a plurality of code posts normally positioned so as to lock the second wheel element to the first wheel element in driving relation,
a pair of actuating means for selectively operating the code posts in opposite senses,
said code posts including preset means for unlocking the second wheel element from the first wheel element dependent upon the selected sense of actuation of the code post by said actuating means,
each of said code posts including adjustable means for angularly positioning said preset means from a first operative position to a second locking position,
means operably connected to the first wheel element for effecting a control function upon the first wheel element being unlocked from the second wheel element upon completion of a predetermined decoding sequence of operation of said actuating means,
a pair of discs rotatably mounted in coaxial relation to said rotatable code wheel assembly,
a spring operatively connected between said discs to angularly bias the discs in opposite senses,
a pair of posts slidably mounted in the first wheel element for operatively connecting the pair of discs in locked relation one with the other against the biasing force of said spring and to said first wheel element,
said pair of discs including peripheral teeth arranged in operative relation with the adjustable means of said code posts,
means for actuating said pair of posts to release said discs from said locking relation one with the other under the biasing force of said spring to cause the peripheral teeth of said discs to actuate the adjustable means of said code posts so as to position the preset means of the code posts from said first operative position to said second locking position to erase the predetermined decoding sequence of operation,
and means for controlling the operation of said last-mentioned actuating means.

29. For use with a pair of electrical circuits that may be energized one circuit at a time in any sequential order,
apparatus for determining if said circuits are energized in a predetermined order,
said apparatus comprising a code wheel including adjustable means for storing said predetermined order therein,
means defining a start position for said code wheel, spring means for biasing said code wheel toward said start position, a ratchet wheel operatively connected to said code wheel, pawl means, motor means selectively operated by said pair of circuits for operating said pawl means, said pawl means being normally in an operative relation with said ratchet wheel for rotating said ratchet wheel and said code wheel in a direction opposed to said spring means, means selectively operated by said motor means for actuating said storing means in said code wheel, means operable by said code wheel for effecting a control function upon the actuation of said storing means being in said predetermined order, and other means for angularly adjusting said actuatable means to a neutral locking position to prevent further rotation of said ratchet wheel and code wheel by said pawl and to erase said predetermined order.

30. For use with a pair of electrical circuits that may be energized one circuit at a time in any sequential order, apparatus for determining if said circuits are energized in a predetermined order, said apparatus comprising a code wheel including adjustable means for storing said predetermined order therein, means defining a start position for said code wheel, spring means for biasing said code wheel toward said start position, a ratchet wheel operatively connected to said code wheel, pawl means, motor means selectively operated by said pair of circuits for operating said pawl means, said pawl means being normally in an operative relation with said ratchet wheel for rotating said ratchet wheel and said code wheel in a direction opposed to said spring means, means selectively operated by said motor means for actuating said storing means in said code wheel, means operable by said code wheel for effecting a control function upon the actuation of said storing means being in said predetermined order, first operator-operative means for selectively adjusting the actuatable means in an angular sense so as to change said predetermined order, other means for angularly adjusting the actuatable means to a locking position to prevent further rotation of said ratchet wheel and said code wheel by said pawl means and to erase said predetermined order, and second operator-operative means for rendering said erasing means effective.

* * * * *